United States Patent
Ahmad et al.

(10) Patent No.: US 12,500,043 B2
(45) Date of Patent: Dec. 16, 2025

(54) PHYSICALLY ACTIVATED CARBON FOR ALL-SOLID-STATE SUPERCAPACITORS AND METHODS OF PREPARATION THEREOF

(71) Applicant: KING FAHD UNIVERSITY OF PETROLEUM AND MINERALS, Dhahran (SA)

(72) Inventors: Aziz Ahmad, Dhahran (SA); Mohammed Ashraf G. Gondal, Dhahran (SA); Atif Alzahrani, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 251 days.

(21) Appl. No.: 18/396,367

(22) Filed: Dec. 26, 2023

(65) Prior Publication Data

US 2025/0210280 A1    Jun. 26, 2025

(51) Int. Cl.
*H01G 11/32* (2013.01)
*H01G 11/44* (2013.01)
*H01G 11/56* (2013.01)

(52) U.S. Cl.
CPC ............ *H01G 11/44* (2013.01); *H01G 11/56* (2013.01)

(58) Field of Classification Search
None
See application file for complete search history.

(56) References Cited

U.S. PATENT DOCUMENTS

| | | | | |
|---|---|---|---|---|
| 12,243,686 B2* | 3/2025 | Shuaibu | ............... | H01G 11/44 |
| 12,278,047 B1* | 4/2025 | Ahmad | ............... | H01G 11/24 |
| 2013/0004408 A1* | 1/2013 | Dua | ............... | C01B 32/342 |
| | | | | 423/445 R |
| 2020/0075268 A1* | 3/2020 | Ahamad | ............... | H01G 11/34 |
| 2025/0210280 A1* | 6/2025 | Ahmad | ............... | H01G 11/34 |

FOREIGN PATENT DOCUMENTS

| | | |
|---|---|---|
| CN | 102557026 A | 7/2012 |
| CN | 105645408 A | 6/2016 |

(Continued)

OTHER PUBLICATIONS

Farma et al.; Hierarchical-nanofiber structure of biomass-derived carbon framework with direct CO2 activation for symmetrical supercapacitor electrodes; Journal of Materials Science: Materials in Electronics; Jan. 12, 2023; Abstract Only; 2 Pages.

(Continued)

*Primary Examiner* — Dion R. Ferguson
(74) *Attorney, Agent, or Firm* — Oblon, McClelland, Maier & Neustadt, L.L.P.

(57) ABSTRACT

An electrode including a substrate, a binding compound, date seed mesoporous carbon, and a conductive carbon (CC) other than the date seed mesoporous carbon. The date seed mesoporous carbon has a surface area of 600-800 $m^2/g$, an average pore size of 1-5 nm, and a sheet morphology. A mixture of the binding compound, the date seed mesoporous carbon, and the conductive carbon other than the date seed mesoporous carbon is coated on the surface of the substrate.

20 Claims, 13 Drawing Sheets

(56) References Cited

FOREIGN PATENT DOCUMENTS

ID            202301052 S      3/2023
WO      2021/154332 A1    8/2021

OTHER PUBLICATIONS

Alazmi ; Synergistic effect of hydrothermal and physical activation approaches to fabricate activated carbon for energy storage applications ; Ceramics International, vol. 48, Issue 15 ; Aug. 1, 2022 ; 4 Pages.

Said et al. ; Activated carbon prepared by hydrothermal pretreatment-assisted chemical activation of date seeds for supercapacitor application ; Inorganic Chemistry Communications, vol. 155 ; Sep. 2023 ; 4 Pages.

\* cited by examiner

PHYSICALLY ACTIVATED CARBON FOR ALL-SOLID-STATE SUPERCAPACITORS AND METHODS OF PREPARATION THEREOF

STATEMENT OF PRIOR DISCLOSURE BY INVENTOR

Aspects of the present disclosure are described in A. Ahmad, M. A. Gondal, M. Hassan, R. Iqbal, S. Ullah, A. S. Alzahrani, W. A. Memon, F. Mabood, and S. Melhi "Preparation and Characterization of Physically Activated Carbon and Its Energetic Application for All-Solid-State Supercapacitors: A Case Study", ACS Omega; 2023; 8; 21653, incorporated herein by reference in its entirety.

STATEMENT OF ACKNOWLEDGEMENT

Support provided by King Fahd University of Petroleum and Minerals (KFUPM) is gratefully acknowledged.

BACKGROUND

Technical Field

The present disclosure is directed to an electrode, particularly to a physically activated carbon-based electrode for all-solid-state supercapacitor applications.

Description of Related Art

The "background" description provided herein is to present the context of the disclosure generally. Work of the presently named inventors, to the extent it is described in this background section, as well as aspects of the description that may not otherwise qualify as prior art at the time of filing, are neither expressly nor impliedly admitted as prior art against the present invention.

The global climate anomalies and cumulative depletion of non-renewable energy sources have encouraged the growth of sustainable energy sources and productive devices for energy storage. The most commonly used electrochemical devices for energy storage are supercapacitors (SCs) and batteries. SCs differ from batteries because of their fast charging, high power density, and discharging rate capabilities. These features make SCs suitable for use in applications where one requires a high power uptake. Electrochemical capacitors are generally composed of electrolytes and electrodes. Electrodes are responsible for charge storage, while electrolytes assist in ion migration between electrodes.

SCs are mainly divided into two types, redox and electrical double-layer capacitors (EDLCs). Redox SCs store charges through fast reversible Faradic reactions on the electrolyte/electrode interface. They exhibit larger capacitance than EDLCs owing to the additional charge migration between the applied potentials. However, the cyclic stability of redox SCs is low because the electrode candidates deteriorate due to the fast Faradic reactions. Active materials such as NiOx, $RuO_2 \cdot xH_2O$, CoOx poly-(anthraquinonyl) sulfide, conducting polymers, e.g., polythiophene, and polyaniline have been used as redox-active materials in redox supercapacitors. In contrast, EDLCs store electrolyte ions/charges on the surfaces of the used electrode materials due to the electrostatic attraction among the adsorbed electrolyte ions and polarized electrode surfaces, resulting in two charged layers called Helmholtz double layers. For the EDLC formation, the electrode materials must have a high conductivity and specific surface area.

Carbon and carbon-based electrodes have gained widespread applications in various energy storage systems because they are low-cost and have thermochemical stability, processability, structural tenability, and textural characteristics to achieve the necessities of the particular applications. The design of the hierarchical porous materials creates larger effective specific surface areas, which attains fast ion transportation. Biomass-based ACs have attained consideration due to their abundant feedstocks, low cost, and porosity, and they promote added value to bio-waste; several bio-waste such as tea leaf residues nutshells vegetable wastes, coconut shells, and apricot shells have been employed as precursor materials to obtain activated carbon (AC). Moreover, the presence of various organic functional groups provides thermal stability to their skeleton, which makes them more promising. The methods of producing AC can be divided mainly into chemical, physical, and physical-chemical activation. Among these, the process of physically activated carbon preparation is advantageous due to its cost-effectiveness and environmental friendliness. Moreover, the mechanism of this approach involves the occurrence of redox reactions among the carbon component of carbon materials and various oxidizing gases, including $CO_2(g)$, $O_2(g)$, $H_2O(g)$, and their mixtures. Among them, activation with $CO_2(g)$ and $H_2O(g)$ is more manageable because the endothermic reactions could reduce the excessive burn-off, enhancing the AC yield and participating in the controllable formation of porous structures. By contrast, the chemical activation method mainly uses NaOH, KOH, $H_3PO_4$, $NaHCO_3$, and $ZnCl_2$. However, this method is expensive and is associated with environmental issues.

Although several materials have been developed in the past for improved supercapacitance applications, a need still exists to construct more effective materials for all-solid-state supercapacitor applications. It is one object of the present disclosure, to produce an electrode material from a renewable source. It is another object of the present disclosure to produce a high performing electrode.

SUMMARY

In an exemplary embodiment, an electrode is described. The electrode includes a substrate, a binding compound, date seed mesoporous carbon, and a conductive carbon other than the date seed mesoporous carbon. The date seed mesoporous carbon has a surface area of 600-800 squared meters per gram ($m^2/g$), and an average pore size of 1-5 nanometers (nm). Further, the date seed mesoporous carbon has a sheet morphology. A mixture of the binding compound, the date seed mesoporous carbon, and the conductive carbon other than the date seed mesoporous carbon is coated on a surface of the substrate.

In some embodiments, the mixture includes 1-10 wt. % of the binding compound, 60-80 wt. % of the date seed mesoporous carbon, and 10-30 wt. % conductive carbon other than the date seed mesoporous carbon, based on a total weight of the mixture.

In some embodiments, the date seed mesoporous carbon includes amorphous graphitic carbon.

In some embodiments, sheets of the date seed mesoporous carbon have an average width of 50-200 nm.

In some embodiments, sheets of the date seed mesoporous carbon have an average length of greater than 200 nm.

In some embodiments, sheets of the date seed mesoporous carbon stack on top of one another.

In some embodiments, the date seed mesoporous carbon includes C, N, and O.

In some embodiments, pores of the date seed mesoporous carbon are present on a surface of the sheets.

In some embodiments, the date seed mesoporous carbon includes both mesopores and micropores.

In some embodiments, the binding compound is a fluorinated polymer.

In some embodiments, the conductive carbon other than the date seed mesoporous carbon is at least one selected from the group consisting of graphite, activated carbon, reduced graphene oxide, carbon nanotubes, carbon nanofibers, and carbon black.

In some embodiments, the substrate is made from at least one material selected from the group consisting of stainless steel, aluminum, nickel, copper, platinum, zinc, tungsten, and titanium.

In some embodiments, the electrode has a specific capacitance of 100-150 Farad per gram (F/g) at a scan rate of 5 mV/s.

In another exemplary embodiment, the method of making date seed mesoporous carbon is described. The method includes pulverizing date seeds into a date seed powder, pyrolyzing the date seed powder at a temperature of 500-700° C. under an inert atmosphere to form a pyrolyzed date seed powder, pulverizing the pyrolyzed date seed powder into a refined date seed powder, and activating the refined date seed powder at a temperature of 700-1,000° C. under carbon dioxide to form the date seed mesoporous carbon.

In some embodiments, the method does not include a chemical activation agent.

In another exemplary embodiment, a supercapacitor is described. The supercapacitor includes two electrodes, and a solid-state electrolyte. The electrodes are disposed facing each other, and the solid-state electrolyte is present between the electrodes to form the supercapacitor.

In some embodiments, the solid-state electrolyte includes a polymer and a base.

In some embodiments, the solid-state electrolyte includes polyvinyl alcohol and KOH.

In some embodiments, the supercapacitor has a power density of 70-100 Watts per Kilogram (W/kg).

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
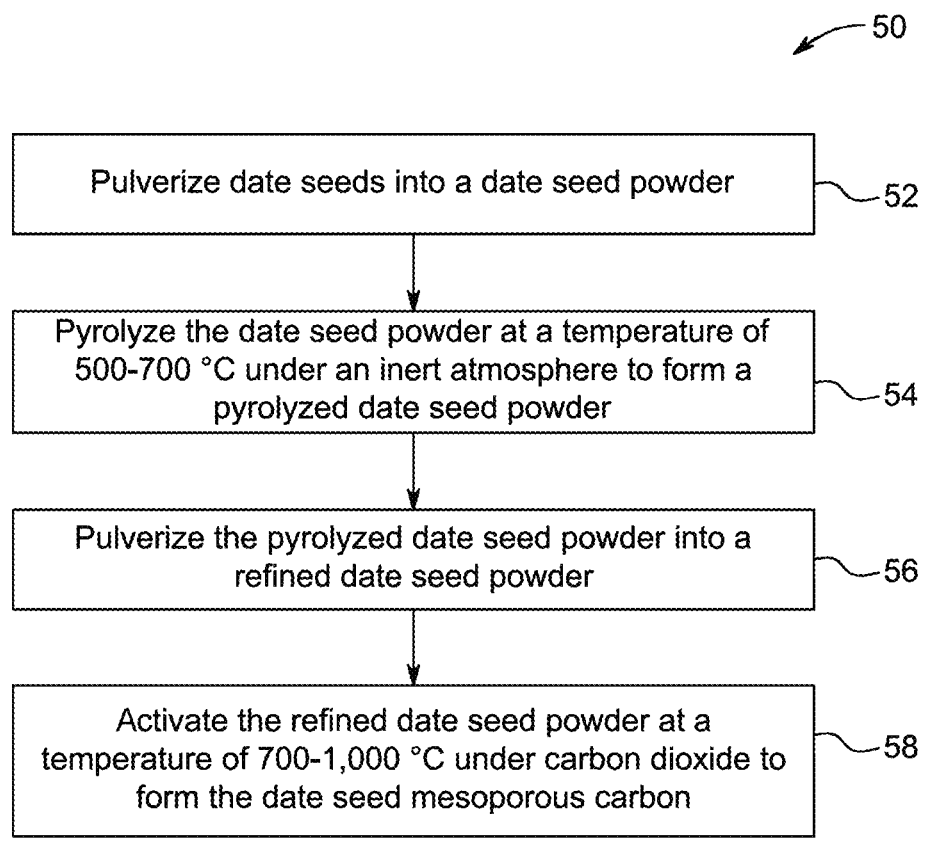
FIG. 1 is a flowchart depicting a method of making date seed mesoporous carbon, according to certain embodiments.

In the drawings, reference numerals designate identical or corresponding parts throughout the several views. Further, as used herein, the words "a," "an," and the like generally carry a meaning of "one or more," unless stated otherwise.

Where a numerical limit or range is stated herein, the endpoints are included. Also, all values and subranges within a numerical limit or range are specifically included as if explicitly written out.

Furthermore, the terms "approximately," "approximate," "about," and similar terms generally refer to ranges that include the identified value within a margin of 20%, 10%, or preferably 5%, and any values therebetween.

As used herein, "compound" is intended to refer to a chemical entity, whether as a solid, liquid, or gas, and whether in a crude mixture or isolated and purified.

As used herein, "particle size" and "pore size" may be thought of as the lengths or longest dimensions of a particle and of a pore opening, respectively.

As used herein, "pulverization" refers to comminution, crushing or grinding. In simpler terms, pulverization is the act of applying external force to a solid object, resulting in its destruction and reduction in size.

As used herein, "pyrolysis" refers to a process of breaking down substances through high temperatures in inert atmospheres.

As used herein, the term "electrode" refers to an electrical conductor used to contact a non-metallic part of a circuit e.g., a semiconductor, an electrolyte, a vacuum, or air.

As used herein, the term "current density" refers to the amount of electric current traveling per unit cross-section area.

As used herein, the term "electrochemical cell" refers to a device capable of either generating electrical energy from chemical reactions or using electrical energy to cause chemical reactions.

As used herein, the term "electrolyte" is a substance that forms a solution that has the ability to conduct electricity when dissolved in a polar solvent.

As used herein, the term "capacitance" refers to the capability of a material/device to store electric charge.

As used herein, the term "energy density" refers to the amount of energy stored in a supercapacitor per unit volume of supercapacitor.

As used herein, the term "power density" refers to the measure of power output per unit volume.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

Aspects of the present disclosure are directed to use of physically activated carbon from date seed biomass used in an electrode. The date seed biomass was physically activated carbon through $CO_2$ activation to produce a material with a high surface area.

An electrode is described. The electrode includes a substrate, a binding compound, date seed mesoporous carbon, and a conductive carbon (CC) other than the date seed mesoporous carbon. In some embodiments, the substrate is made from at least one material selected from the group consisting of stainless steel, aluminum, nickel, copper, platinum, zinc, tungsten, and titanium. In a preferred embodiment, the substrate is made from aluminum.

In an embodiment, the binding compound is one or more selected from a group consisting of polyvinylidene fluoride (PVDF)-based polymers, such as poly(vinylidene fluoride) (PVDF) and its co- and terpolymers with hexafluoro ethylene, tetrafluoroethylene, chlorotrifluoroethylene, polyvinyl fluoride), polytetrafluoroethylene (PTFE), ethylene-tetrafluoroethylene copolymers (ETFE), polybutadiene, cyanoethyl cellulose, carboxymethyl cellulose and its blends with styrene-butadiene rubber, polyacrylonitrile, ethylene propylene diene terpolymers (EPDM), styrene-butadiene rubbers (SBR), polyimides, ethylene-vinyl acetate copolymers. In an embodiment, the binding compound is a fluorinated polymer. In an embodiment, the binding compound is PVDF.

In some embodiments, the mesoporous carbon is made from date seeds. In some embodiments, the mesoporous carbon can be made from another organic source such as but not limited to apple, apricot, avocado, banana, blackberry, blackcurrant, blueberry, boysenberry, cacao, cactus pear, cherry, coconut, crab apple, cranberry, currant, dragonfruit, durian, elderberry, fig, grape, raisin, grapefruit, guava, huckleberry, jackfruit, juniper berry, kiwifruit, kumquat, lemon, lime, loganberry, loquat, lychee, mango, melon, cantaloupe, honeydew, watermelon, mulberry, nectarine, orange, blood orange, clementine, mandarin, tangerine, *papaya*, passionfruit, peach, pear, plantain, plum, pineapple, pineberry, pomegranate, pomelo, raspberry, redcurrant, star fruit, strawberry, and yuzu. In a preferred embodiment, the organic material includes at least 20 wt. %, preferably 30 wt. %, 40 wt. %, 50 wt. %, 60 wt. %, 70 wt. %, 80 wt. %, or 90 wt. % of a volatile compound such as lignin, cellulose, hemicellulose, and lignocellulose, based on a total weight of the organic material without water.

In some embodiments, the date seed mesoporous carbon includes carbon (C), nitrogen (N) and (O) elements. In some embodiments, the date seed mesoporous carbon includes sulfur (S), silicon (Si), and/or phosphorus (P). In a preferred embodiment, the date seed mesoporous carbon includes less than 10 wt. %, preferably 1-10 wt. %, 2-9 wt. %, 3-8 wt. %, 4-7 wt. %, or 5-6 wt. % of the S, Si, and P, based on a total weight of the date seed mesoporous carbon. In a preferred embodiment, the date seed mesoporous carbon consists of carbon (C), nitrogen (N) and (O) elements.

In some embodiments, the date seed mesoporous carbon may exist in a morphological form such as wires, spheres, sheets, rods, crystals, rectangles, triangles, pentagons, hexagons, prisms, disks, cubes, ribbons, blocks, beads, toroids, discs, barrels, granules, whiskers, flakes, foils, powders, boxes, stars, tetrapods, belts, flowers, etc. and mixtures thereof. In a specific embodiment, the date seed mesoporous carbon has predominantly a sheet morphology. In some embodiments, the sheets have an average width of 50-200 nm, preferably 60-190 nm, preferably 70-180 nm, preferably 80-170 nm, preferably 90-160 nm, preferably 100-150 nm, preferably 110-140 nm, and preferably 120-130 nm. In some embodiments, sheets of the date seed mesoporous carbon have an average length of greater than 200 nm, preferably 250 nm, preferably 300 nm, preferably 350 nm, preferably 400 nm, and preferably up to 500 nm. In some embodiments, sheets of the date seed mesoporous carbon stack on top of one another. In some embodiments, the sheets are stacked directly on top of one another. In a preferred embodiment, the sheets do not stack directly on top of one another but rather are offset in at least one direction. In a preferred embodiment, the sheets are offset by at least 50 nm, preferably 75 nm or 100 nm.

The date seed mesoporous carbon includes pores. In some embodiments, the pores are micropores (less than 2 nm), mesopores (2-50 nm) and/or macropores (greater than 200 nm). In a preferred embodiment, the pores are a combination of micropores and mesopores. In some embodiments, an average pore size is 1-5 nm, preferably 1.5-4.5 nm, preferably 2-4 nm, and yet more preferably 2.5-3.5 nm. In a preferred embodiment, there are no pores larger than 20 nm, preferably 10 nm or 5 nm. In some embodiments, the pores of the date seed mesoporous carbon are present on a surface of the sheets. In other words, in the process of making the date seed mesoporous carbon holes open up in a sheet, preferably towards a center of a sheet. In an embodiment, the pore is at least 10 nm from an edge of the sheet preferably, 20 nm, 30 nm, 40 nm, or 50 nm.

The date seed mesoporous carbon has a surface area of 600-800 $m^2/g$, preferably 615-785 $m^2/g$, preferably 630-770 $m^2/g$, preferably 645-755 $m^2/g$, preferably 660-740 $m^2/g$, preferably 675-725 $m^2/g$, and preferably 690-710 $m^2/g$. In some embodiments, the date seed mesoporous carbon has a stability, meaning the structure does not degrade, up to 700° C., preferably 800° C., or about 900° C.

In some embodiments, date seed mesoporous carbon is in the form of amorphous graphitic carbon. A graphitic structure is defined herein as carbon sheets with a hexagonal crystal structure. In some embodiments, as previously described the sheets stack on top of one another forming a crystalline structure. In a preferred embodiment of the present disclosure, the sheets are not stacked directly on top of one another but instead form an unorganized amorphous structure. In some embodiments, the graphitic structure includes 5 and 6-membered rings. In a preferred embodiment, the graphitic structure includes at least 90% 6-membered rings, preferably 95%, or 99%. In some embodiments, oxygen is incorporated into the graphitic structure through a phenol (—OH) and/or through an ether bond with the carbon (R—O—R) In some embodiments, nitrogen is incorporated into the graphitic structure through graphitic nitrogen and/or pyridinic nitrogen.

The electrode further includes a CC compound other than the date seed mesoporous carbon. In some embodiments, the CC compound is at least one of graphite, activated carbon, reduced graphene oxide, carbon nanotubes, carbon nanofibers, and carbon black. In a preferred embodiment, the CC compound is carbon black.

The binding compound, the date seed mesoporous carbon, and the conductive carbon other than the date seed mesoporous carbon together form a mixture, and the mixture is coated on a surface of the substrate. In an embodiment, the mixture includes 1-10 wt. %, preferably 2-9 wt. %, preferably 3-8 wt. %, preferably 4-7 wt. %, preferably 5-6 wt. % of the binding compound; and 60-80 wt. %, preferably 61-79 wt. %, preferably 62-78 wt. %, preferably 63-77 wt. %, preferably 64-76 wt. %, preferably 65-75 wt. %, preferably 66-74 wt. %, preferably 67-73 wt. %, preferably 68-72 wt. %, preferably 69-71 wt. % of the date seed mesoporous carbon. The mixture further includes about 10-30 wt. %, preferably 11-29 wt. %, preferably 12-28 wt. %, preferably 13-27 wt. %, and preferably 14-26 wt. %, preferably 15-25 wt. %, preferably 16-24 wt. %, preferably 17-23 wt. %, preferably 18-22 wt. %, preferably 19-21 wt. % conductive carbon other than the date seed mesoporous carbon, based on the total weight of the mixture. The mixture is coated on at least 50%, preferably 55%, 60%, 65%, 70%, 75%, 80%, 85%, 90%, 95%, 96%, 97%, 98%, 99%, of the substrate. The coating can be done by any method in the art, including but not limited to drop casting, spin coating, and using an automatic coating machine.

In some embodiments, the electrode has a specific capacitance of 100-150 Farad per gram (F/g), preferably 110-140 F/g, or about 120-130 F/g at a scan rate of 5 mV/s.

In another exemplary embodiment, a supercapacitor is described. The supercapacitor includes two of the electrodes of the present disclosure and a solid-state electrolyte. In some embodiments, the solid-state electrolyte includes a polymer and a base. Suitable examples of polymers include polypropylene (PP), polyamide (PA), polycarbonate (PC), polyvinyl alcohol (PVA), polyvinyl chloride (PVC), high-density polyethylene (HDPE), low-density polyethylene (LDPE), polybutylene terephthalate (PBT), polyethylene terephthalate (PET), polystyrene (PS), polyether ether ketone (PEEK), polyphenylene sulfide (PPS), polyetherimide (PEI), polyamide-imide (PAI), acrylic (PAA), acrylonitrile butadiene styrene (ABS), polylactic acid (PLA), polyvinylidene fluoride (PVDF), polytetrafluoroethylene (Teflon), and/or a mixture thereof. The base selected from the group that consists of an alkaline earth metal hydroxide and an alkali metal hydroxide. The base may be organic or inorganic. Suitable examples of inorganic bases may be KOH, LiOH, NaOH, $Be(OH)_2$, $Mg(OH)_2$, $Ca(OH)_2$, $Sr(OH)_2$, $Ba(OH)_2$, or some other inorganic base. In a preferred embodiment, the solid-state electrolyte includes PVA and KOH. In some embodiments, the electrodes are disposed facing each other. The solid-state electrolyte is present between the electrodes to form the supercapacitor.

In some embodiments, the supercapacitor has a power density of 70-100 Watts per Kilogram (W/kg), preferably 71-99 W/kg, preferably 72-98 W/kg, preferably 73-97 W/kg, preferably 74-96 W/kg, preferably 75-95 W/kg, preferably 76-94 W/kg, preferably 77-93 W/kg, preferably 78-92 W/kg, preferably 79-91 W/kg, preferably 80-90 W/kg, preferably 81-89 W/kg, preferably 82-88 W/kg, preferably 83-87 W/kg, and preferably 84-86 W/kg.

In some embodiments, the supercapacitor may be attached to a wearable device and function as a battery to provide electric power to various components of the wearable device. Particularly, the supercapacitor may be electrically connected to a sensor, thereby facilitating the sensor to detect various operating conditions or parameters of the wearable device. In an example, the wearable device may be a wristwatch. In some examples, the wearable device may be any device that may be deriving power from a power source such as a battery; as such, the supercapacitor of the present disclosure may be implemented in the device to function as a battery.

In some embodiments, a plurality of the supercapacitors may be connected in parallel and/or series to form a power bank, which may act as a power source for powering electrical devices. According to the present disclosure, 2-10, preferably 3-9, 4-8, or 5-7 of the supercapacitors may be connected in parallel and/or series to form the power bank. The number of supercapacitors in the power bank may be determined based on the intended use of the power bank for the specified electrical devices.

In some embodiments, the supercapacitor may be attached to a wearable device and function as a battery to provide electric power to various components of the wearable device. Particularly, the supercapacitor may be electrically connected to a sensor, thereby facilitating the sensor to detect various operating conditions or parameters of the wearable device. In an example, the wearable device may be a wristwatch. In some examples, the wearable device may be any device that may be deriving power from a power source such as a battery; as such, the supercapacitor of the present disclosure may be implemented in the device to function as a battery.

FIG. 1 illustrates a flow chart of a method 50 of making date seed mesoporous carbon. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes pulverizing date seeds into a date seed powder. Generally, dates (*Phoenix dactylifera*) are cultivated in the tropical region as a flowering plant that belongs to the palm family, Aceraceae, and is well known for their sweet edible fruit. Date seeds are used owing to their structural organization, high lignocellulosic nature, and low ash content. Their composition is 42% cellulose, 18% hemicellulose, 25% sugar and other compounds, 11% lignin, and 42% ash. Date seeds account for 11-18% of the weight of the date fruit. The date manufacturing industry produces a large amount of date seeds, but only a small portion of those seeds are used as cattle feed, with the majority being discarded as waste. These date seeds may be commercially procured thoroughly cleaned with distilled water to remove any contaminants. The washed dates were further dried in an oven at 90 to 140° C., preferably 95 to 130° C., preferably 100 to 120° C., preferably about 105 to 110° C., to reduce the moisture content to below 5 wt. %, preferably below 4 wt. %, preferably below 3 wt. %, preferably below 2 wt. %, preferably below 1 wt. %. to obtain dried date seeds. The dried date seeds may be further pulverized or ground using any suitable means, for example, ball milling, blending, etc., using manual method (e.g., mortar) or machine-assisted methods such as using a mechanical blender, or any other apparatus known to those of ordinary skill in the art.

At step 54, the method 50 includes pyrolyzing the date seed powder at a temperature of 500-700° C., preferably 515-685° C., preferably 530-670° C., preferably 545-655° C., preferably 560-640° C., preferably 575-635° C., and preferably 590-620° C. under an inert atmosphere to form a pyrolyzed date seed powder. In some embodiments, the inert atmosphere can be provided nitrogen, helium, and argon. In an embodiment, the pyrolysis may be performed by placing the powder into a furnace such as a tube furnace, for example, in a ceramic crucible (e.g., an alumina crucible) or other forms of containment, and heating to the temperatures described above. The furnace is preferably equipped with a temperature control system, which may provide a heating rate of up to 50° C./min, or preferably up to 40° C./min, or preferably up to 30° C./min, preferably up to 20° C./min, preferably up to 10° C./min; and a cooling rate of 1 to 15° C./min, preferably 3 to 10° C./min, preferably 5 to 6° C./min to a temperature described above. In a preferred embodiment, the pyrolyzing of the date seed powder is done in a furnace at 600° C. under an inert atmosphere of nitrogen ($N_2$) for 1 h.

At step 56, the method 50 includes pulverizing the pyrolyzed date seed powder into a refined date seed powder. In a preferred embodiment, the pulverizing of the pyrolyzed date seed powder into a refined date seed powder is done by using a mortar and pestle.

At step 58, the method 50 includes activating the refined date seed powder at a temperature of 700-1,000° C., preferably 720-980° C., preferably 740-960° C., preferably 760-940° C., preferably 780-920° C., preferably 800-900° C., preferably 820-880° C., and preferably 840-860° C., under carbon dioxide to form the date seed mesoporous carbon. In a preferred embodiment, the activating of the refined date seed powder is done at a temperature of 850° C. In some embodiments, the method does not include a chemical activation agent. Chemical activation agents include but are not limited to NaOH, KOH, $H_3PO_4$, $NaHCO_3$, and $ZnCl_2$. In some embodiments, the method only includes a physical activation agent in order to form a porous structure.

While not wishing to be bound to a single theory, it is though that the unique method of making the date seed activated carbon, produces an activated carbon having unique morphology and improved properties. The initial pyrolyzing eliminates the bulk of volatile compounds lignin, cellulose, hemicellulose, and lignocellulose in the date seeds. Then during the physical activation process at high temperatures, oxygen species of the activating agent interact with the tarry off-product restricted in the pores. Thus, this process leads to the opening of the closed pores, forming small mesopores by burning off of the majority of the micropores. Unexpectedly, even with the small pore size of the date seed activated carbon, in the electrode and supercapacitor the total available pores are utilized by the ions resulting in a high performance.

EXAMPLES

The following examples demonstrate an electrode. The examples are provided solely for illustration and are not to be construed as limitations of the present disclosure, as many variations thereof are possible without departing from the spirit and scope of the present disclosure.

Example 1: Chemicals and Materials

All the chemicals used were of analytical rank and were utilized as received. Potassium hydroxide (KOH), polyvinyl alcohol [$C_2H_4O$]x, ethanol ($C_2H_5OH$), and acetone ($C_2H_6O$) were received from Sigma-Aldrich. Polyvinylidene fluoride (PVDF, —($C_2H_2F_2$)n-), carbon black (CB), and N-methyl-2-pyrrolidone (NMP, $C_5H_9NO$) were received from MTI Corp. De-ionized water was used for the solution preparation.

Example 2: Preparation of Activated Carbon

Figure 2:
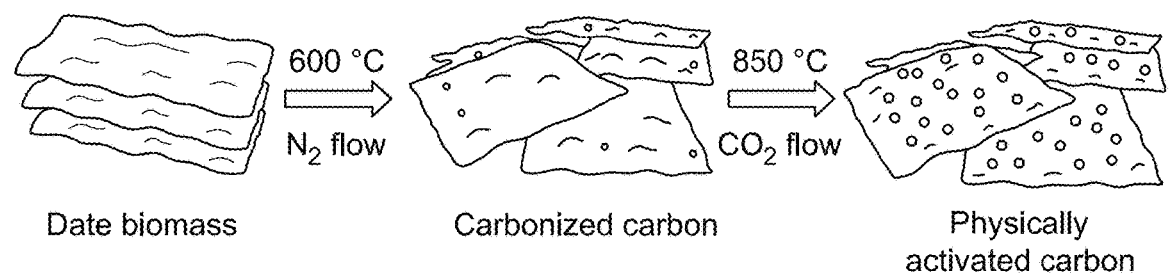
FIG. 2 is a schematic illustration depicting a process of preparing physically activated carbon from date seed biomass, according to certain embodiments.

Date seeds were amassed from a local date seed packing company. The date seeds were washed repeatedly by tap and distilled water. The cleaned seeds were then ground into a fine powder and used as raw materials. In the next step, the obtained date powder was kept in a furnace for carbonization at 873 K (600° C.), and it was held for 1 h under the $N_2$ environment. The obtained carbonized carbon was named C-600. The C-600 was ground further into small particles using a mortar and pestle to get a refined surface with small particles. Further, the ground C-600 was kept in the furnace and activated by $CO_2$ at 1123 K (850° C.) for 60 min. The achieved physically activated carbon was washed with distilled water and ethanol. The final obtained physically activated carbon was named C-850 and was tested as an electrode candidate for the all-solid-state SCs with no further chemical treatment. The schematic illustration for the synthesis of the C-600 and the C-850 is shown in FIG. 2.

Example 3: Sample Characterization Techniques

The surface morphologies of the achieved C-600 and C-850 samples were characterized using a field emission scanning electron microscope (FESEM, HITACHI SU8220) and transmission electron microscope (TEM 200 KV, Tecnai G20 STWIN). Elemental analysis of the used materials was performed by X-ray photoelectron spectroscopy (XPS, ESCALAB 250Xi XPS Microprobe, micro-focusing X-ray monochromator, Thermo Scientific, U.S.). The amorphous nature of C-600 and the C-850 was analyzed by X-ray diffraction (XRD, MiniFlex, Rigaku, Japan). The diffractometer was used at 10 mA current, 30 kV voltage, and 0.15416 nm λ. The Raman spectra of C-600 and C-850 were measured at room temperature by Raman spectroscopy (iHR320 image spectrometer equipped with a CCD detector, HORIBA, Kyoto, Japan). A Micromeritics ASAP 2020 machine was utilized to analyze the pore size distribution and specific surface area (SSA) by Brunauer-Emmett-Teller (BET) $N_2$ adsorption/desorption. The thermal stabilities of C-600 and C-850 samples were tested by thermogravimetric analysis (TGA). A Pyris Diamond TGA/DTA equipment (manufactured by Perkin Elmer Instruments Co. Ltd, Waltham, Massachusetts, United States) was used. TGA results of the aforementioned samples were recorded between 30 and 1000° C. with a heating speed of 5° C. min$^{-1}$ under a $N_2$ environment. The Fourier transform infrared (FT-IR) spectra of C-600 and C-850 samples were obtained through KBr disks in transmission mode using a Perkin-Elmer Spectrum-One Spectrometer (manufactured by Perkin Elmer Instruments Co. Ltd, Waltham, Massachusetts, United States).

Figure 3:
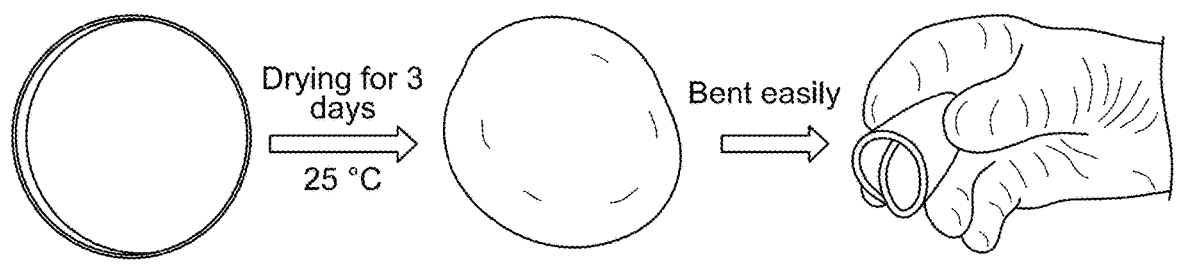
FIG. 3 shows a process of preparing polyvinyl alcohol (PVA)/potassium hydroxide (KOH) gel electrolyte thin film with flexibility, according to certain embodiments.

Example 4: Synthesis of Polyvinyl Alcohol (PVA)/Potassium Hydroxide (KOH) Electrolyte A gel polymer electrolyte of PVA/KOH was prepared. Initially, 2 g of PVA was added to 40 mL of distilled water. A temperature around 95° C. was fixed, and the PVA/$H_2O$ mixture was stirred until the PVA dissolved completely and a transparent solution appeared. At this stage, an equal amount of the dissolved KOH (2 g in 20 mL of $H_2O$) was added dropwise to the transparent PVA solution. The PVA/KOH mixture was stirred until the water evaporated (95° C.), and a thick paste was achieved. The PVA/KOH transparent paste was added into a glass Petri dish, which was kept at room temperature for 3 days to form a wet gel thin film. A schematic illustration depicting a process for preparing the PVA/KOH gel electrolyte thin film with flexibility is shown in FIG. 3.

Example 5: Assembling of the all-Solid-State SCs

The electrodes were fabricated from C-850 (70%), carbon black (CB, 20%), and -polyvinylidene fluoride (PVDF, 5%). A fixed proportion of C-850, CB, and PVDF was mixed and ground well using a mortar and pestle. The weight of active materials in the electrodes was 2.2 mg. In the next step, the ground mixture and 5 mL of N-methyl-2-pyrrolidone (NMP) were placed in a beaker and stirred vigorously at 85° C. for 5 h to form a thick homogeneous paste. The gained homogeneous thick paste was cast on Al foil using a doctor blade and vacuum-dried at 80° C. overnight. The casted electrodes on the Al foil were cut into small slices, and an all-solid-state symmetric SC was configured. The configuration of Swagelok assembled SCs was kept as Al/C-850//PVA-KOH//C-850/Al to perform the electrochemical tests.

Example 6: Electrochemical Tests

The electrochemical tests of the assembled solid-state SCs were performed using a potentiostat (PGSTAT302N, Metrohm Autolab) at ambient temperature. Galvanostatic charge-discharge (GCD), electrochemical impedance spectroscopy (EIS), Bode plot, and cyclic voltammetry (CV) were applied to investigate the charge transfer resistance, electric double formation, and the activated carbon nature of the fabricated electrodes. The specific capacitance from CV and charge-discharge curves were calculated using Eq. 1 and Eq. 2, whereas the energy and power densities were calculated using Eq. 3 and 4 as follows:

$$C_s = \frac{1}{m \times v \times \Delta V} \int_{V_1}^{V_2} I \, dV \, (F g^{-1}) \qquad (1)$$

$$C_s = \frac{I \times \Delta t}{m \times \Delta V} (F g^{-1}) \qquad (2)$$

$$E_d = \frac{1/2 \times C_s}{3.6} \Delta V^2 (Wh \, kg^{-1}) \qquad (3)$$

$$P_d = \frac{E_d}{\Delta t} \times 3600 \, (W \, kg^{-1}) \qquad (4)$$

where $C_s$ represents the specific capacitance in Farad per gram (F·g$^{-1}$), m stands for the active mass of electrode in g, $\int_{V_1}^{V_2} I \, dV$ represents the area below the CV curve, $\Delta V$ is the difference in applied potential, v is the applied scan speed (V·s$^{-1}$), I is the applied current in ampere, and $\Delta t$ is the difference in discharge time in s. Ed and Pd are the energy and power densities of the assembled all-solid Al/C-850//PVA-KOH//C-850/Al symmetric SCs and are measured in Wh kg$^{-1}$ and W kg$^{-1}$, respectively.

Example 7: Sample Characterization

To eliminate the bulk of volatile compounds (lignin, cellulose, hemicellulose, and lignocellulose) and achieve a carbon material with enhanced porosity, date biomass was first exposed to pretreatment at 600° C. under an inert environment followed by the activation with $CO_2$. The carbon obtained at 600° C. under an inert environment of $N_2$ is due to the removal of soft volatile matter. This carbon was prepared at 600° C., so it was named C-600. During the physical activation process at high temperatures, at first, oxygen species of the activating agent interact with the tarry off-product restricted in the pores. Thus, this process leads to the opening of the closed pores. The development of heteropores occurred as the oxidizing agent burnt the areas that are more reactive in the carbon skeleton of C-600 at high temperatures. $CO_2$ was used as the activating agent at 850° C.; the obtained physically activated carbon was named C-850.

Figure 4A:
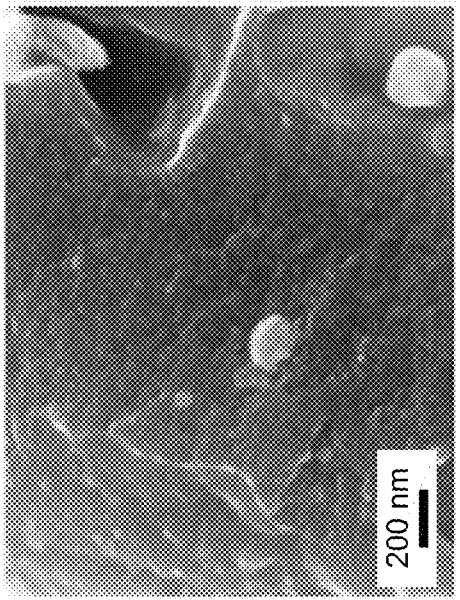
FIG. 4A shows a scanning electron microscopic (SEM) image of a date seed biomass carbonized at 600° C. (designated as C-600), according to certain embodiments.
Figure 4B:
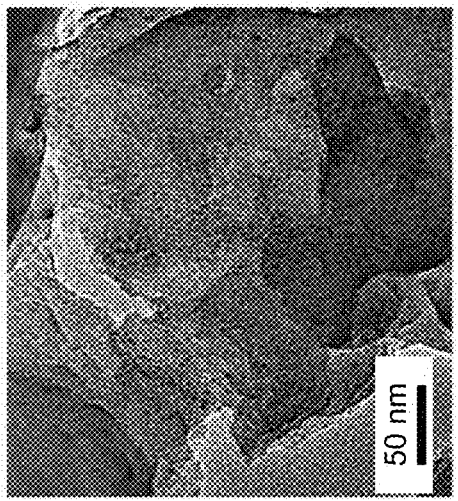
FIG. 4B shows high-resolution transmission electron microscopic (HR-TEM) image of C-600 at 50 nanometers (nm) magnification, according to certain embodiments.
Figure 4C:
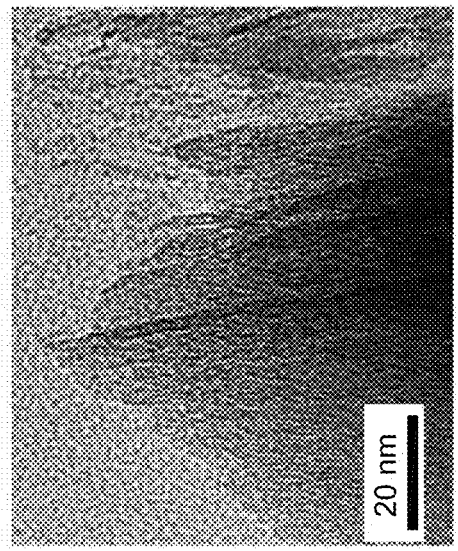
FIG. 4C shows HR-TEM image of C-600 at 20 nm magnification, according to certain embodiments.
Figure 4D:
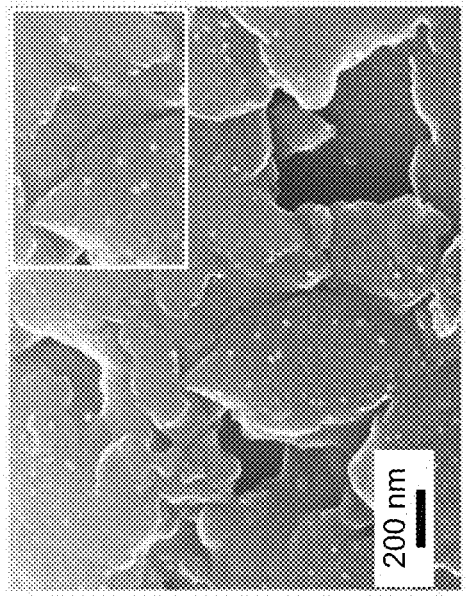
FIG. 4D shows a SEM image of a date seed biomass carbonized at 850° C. (designated as C-850), according to certain embodiments.
Figure 4E:
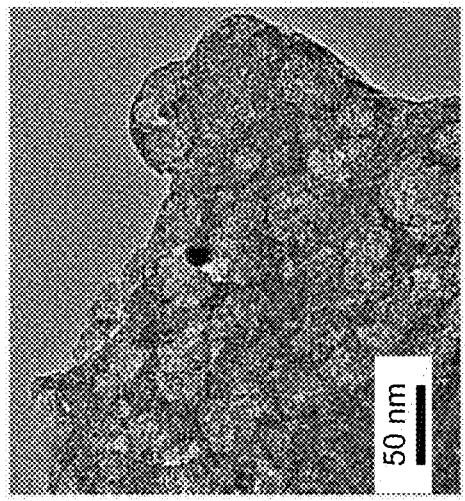
FIG. 4E shows HR-TEM image of C-850 at 50 nm magnification, according to certain embodiments.
Figure 4F:
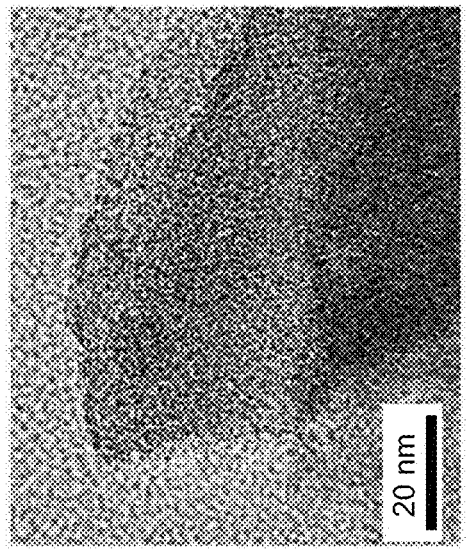
FIG. 4F shows HR-TEM image of C-850 at 20 nm magnification, according to certain embodiments.

SEM, EDS, and HRTEM were used to study the surface morphology, elemental composition, and multilayer nature of C-600 and C-850. FIGS. 4A-4C show the SEM images of C-600 at various magnifications. FIG. 4A illustrates that C-600 exhibited a foam-type morphology with no obvious pore formation, whereas the HRTEM images (FIG. 4B and FIG. 4C) of C600 at high and low magnifications illustrate its flat-type and multi-layer nature morphology. FIG. 4D exhibits the SEM image of the C-850 with apparent pore formation. A particular area in FIG. 4D, enclosed by a rectangle, was magnified further, illustrating the apparent heteropore formation with a sheet-type morphology. The HRTEM images (FIG. 4E and FIG. 4F) of the C-850 further confirmed the apparent pore formation, sheet-type morphology, and its amorphous nature.

Figure 5A:
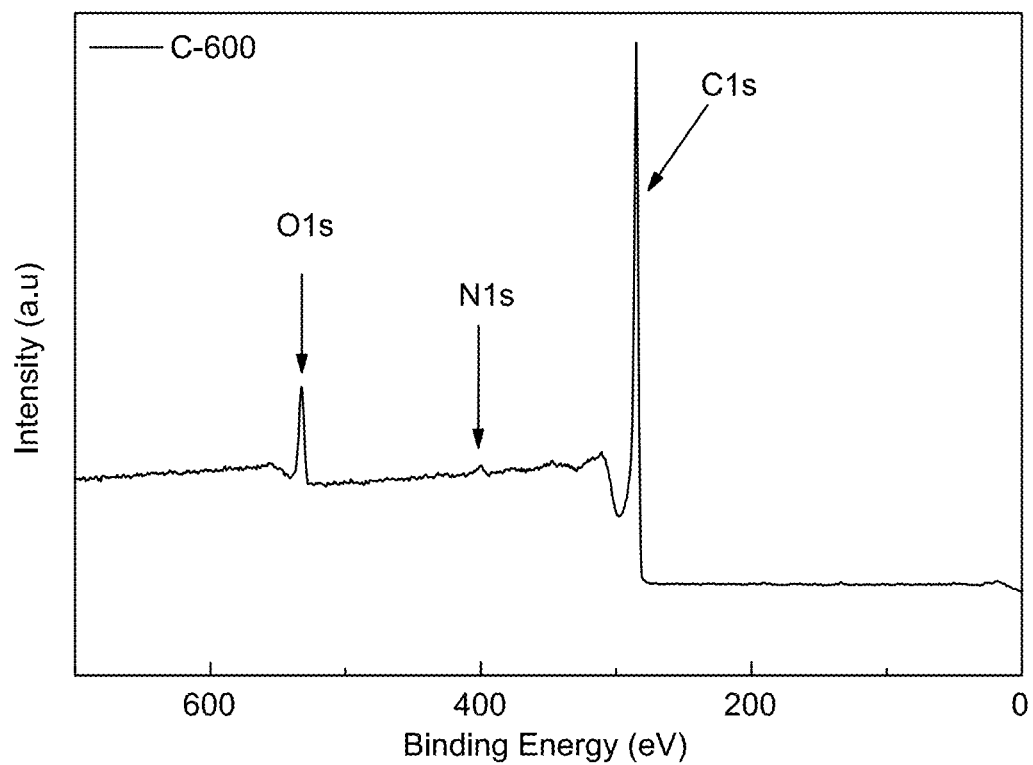
FIG. 5A shows a X-ray photoelectron (XPS) spectroscopy surface chemical analysis survey scan of the C-600 activated carbon.
Figure 5B:
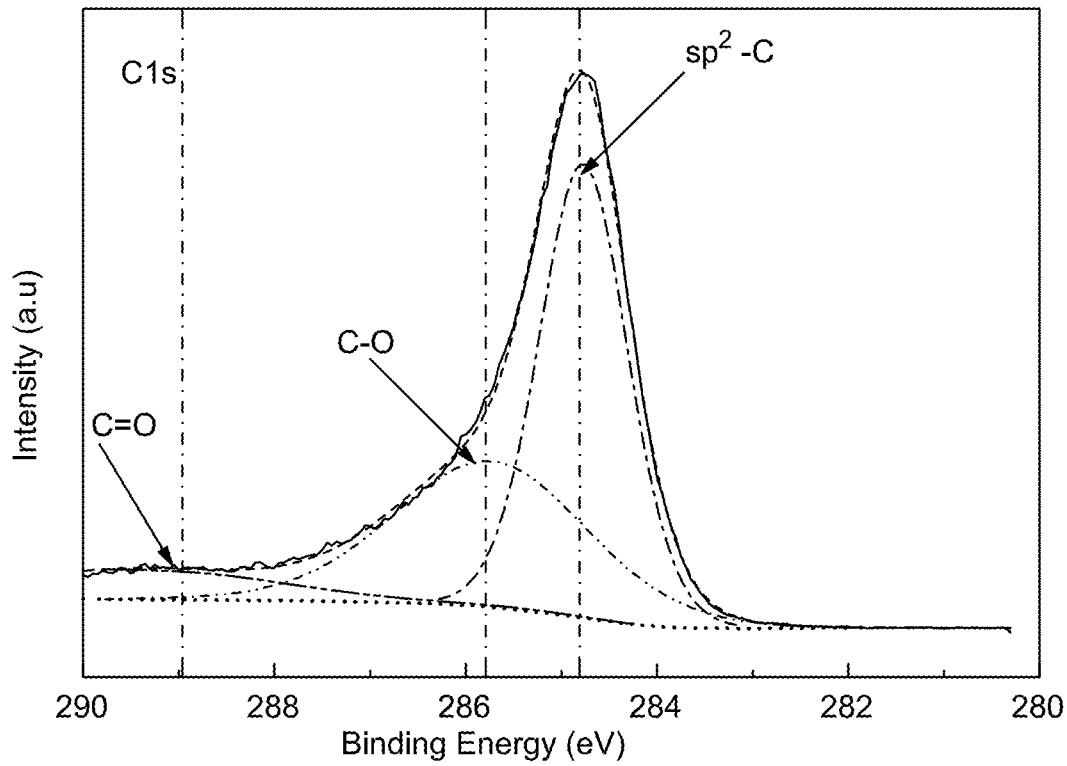
FIG. 5B shows a corresponding high-resolution spectra of C1s, of the C-600 activated carbon, as obtained by XPS surface chemical analysis, according to certain embodiments.
Figure 5C:
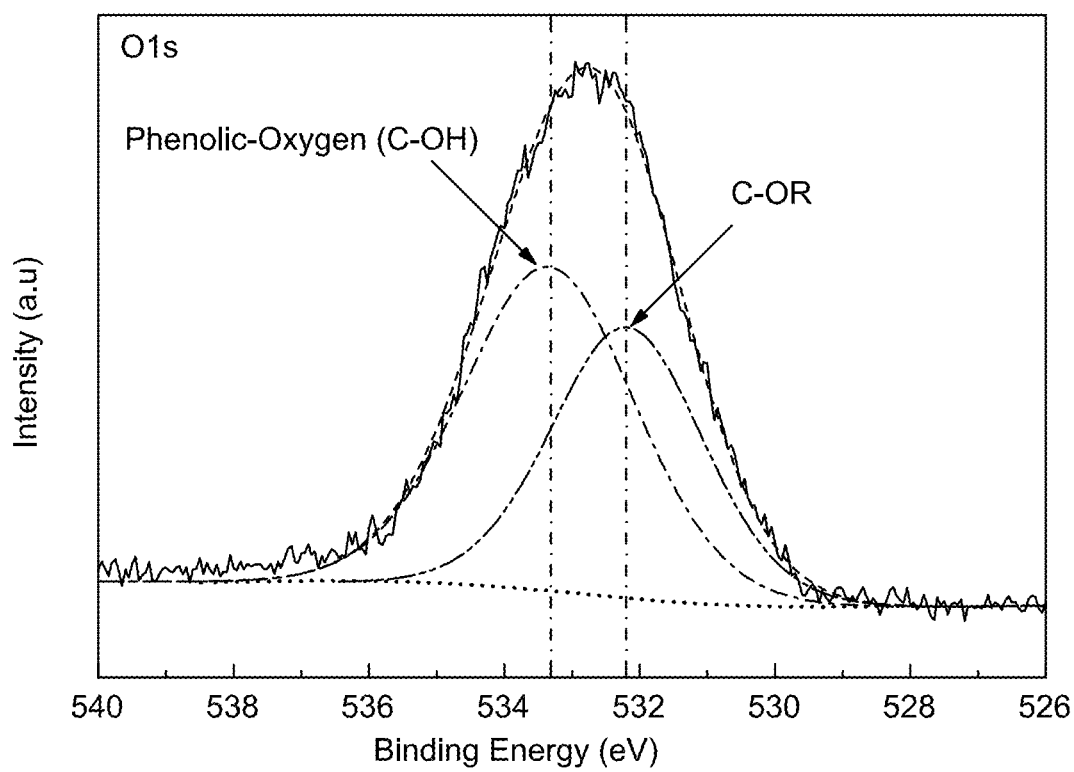
FIG. 5C shows a corresponding high-resolution spectra of O1s, of the C-600 activated carbon, as obtained by XPS surface chemical analysis, according to certain embodiments.
Figure 5D:
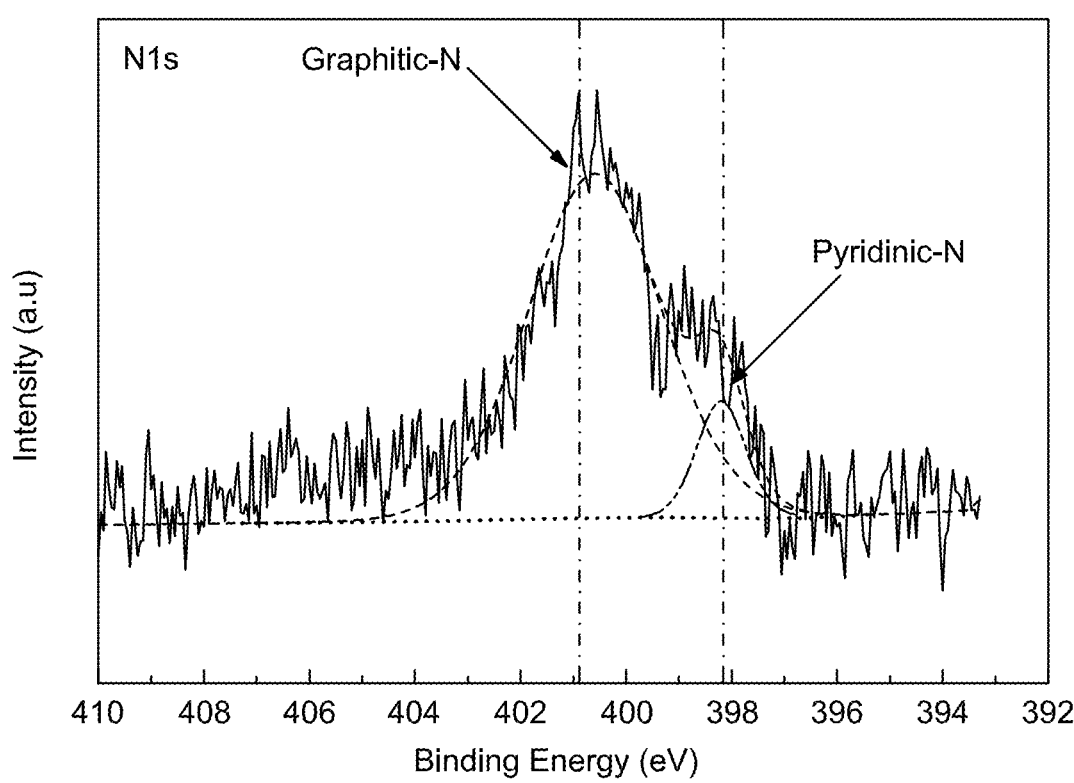
FIG. 5D shows a corresponding high-resolution spectra of N1s, of the C-600 activated carbon, as obtained by XPS surface chemical analysis, according to certain embodiments.
Figure 6A:
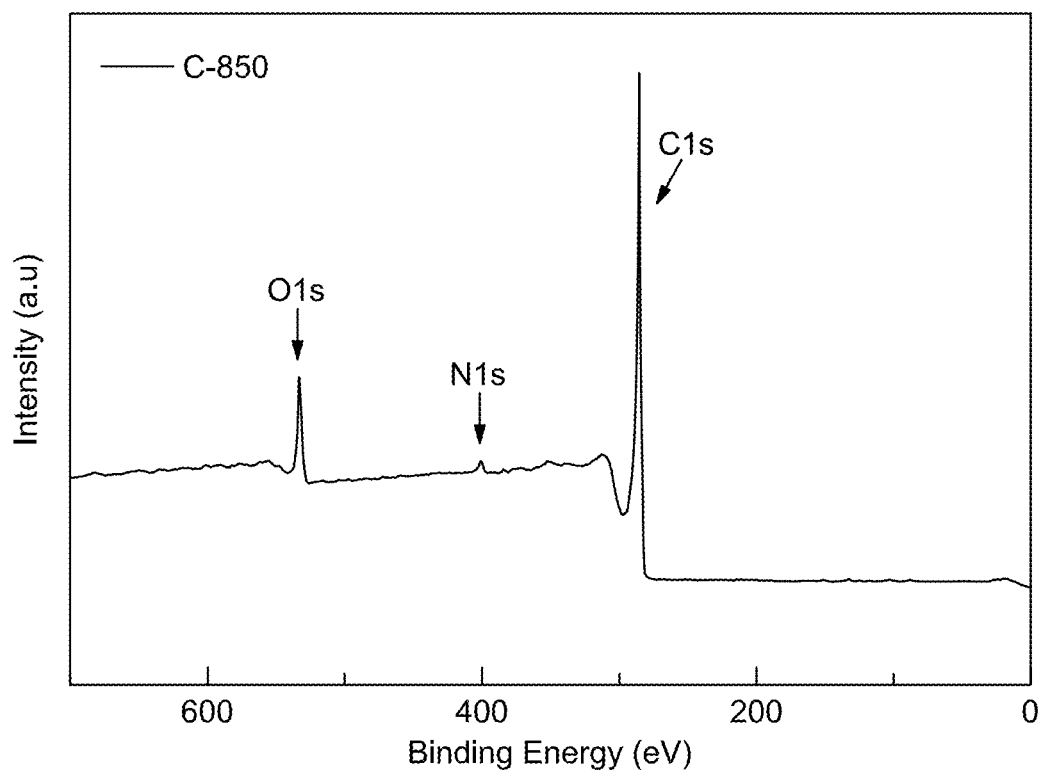
FIG. 6A shows a X-ray photoelectron (XPS) spectroscopy surface chemical analysis survey scan of the C-850 activated carbon.
Figure 6B:
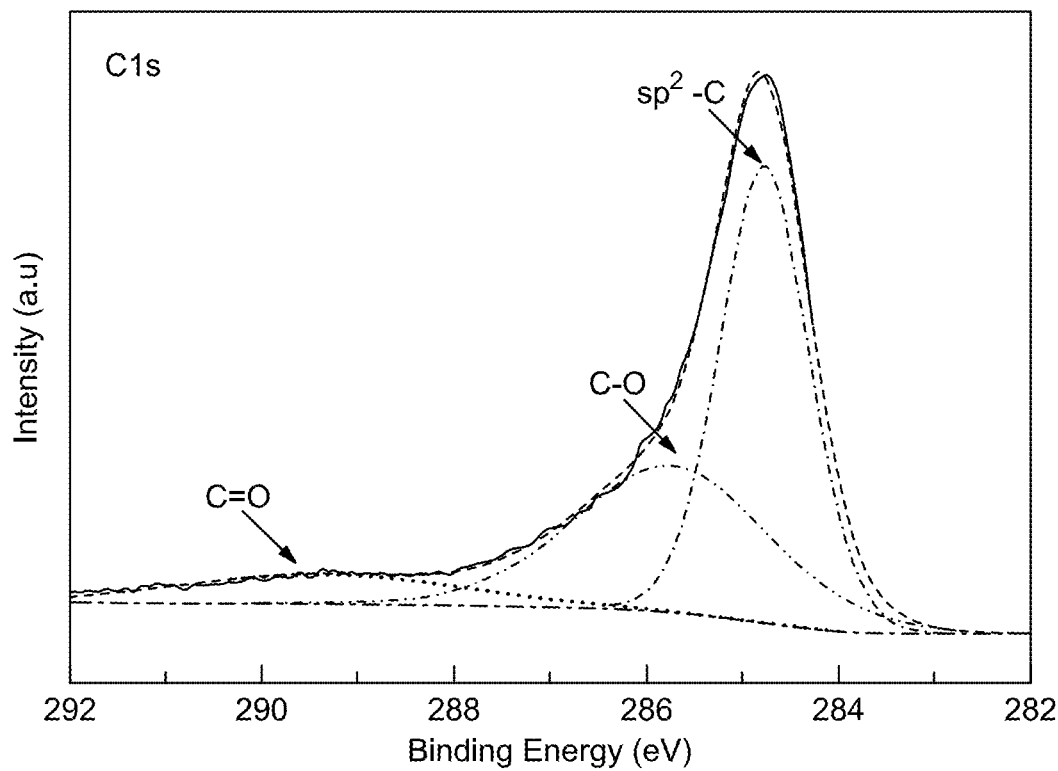
FIG. 6B shows a corresponding high-resolution spectra of C1s, of the C-850 activated carbon, as obtained by XPS surface chemical analysis, according to certain embodiments.
Figure 6C:
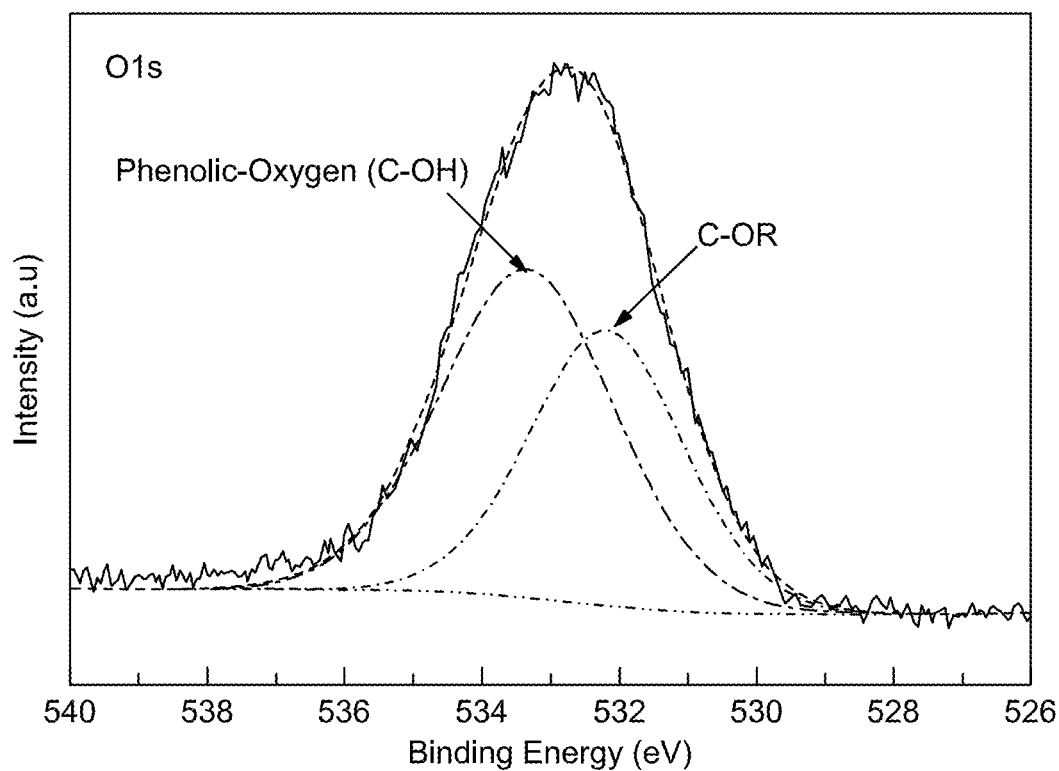
FIG. 6C shows a corresponding high-resolution spectra of O1s, of the C-850 activated carbon, as obtained by XPS surface chemical analysis, according to certain embodiments.
Figure 6D:
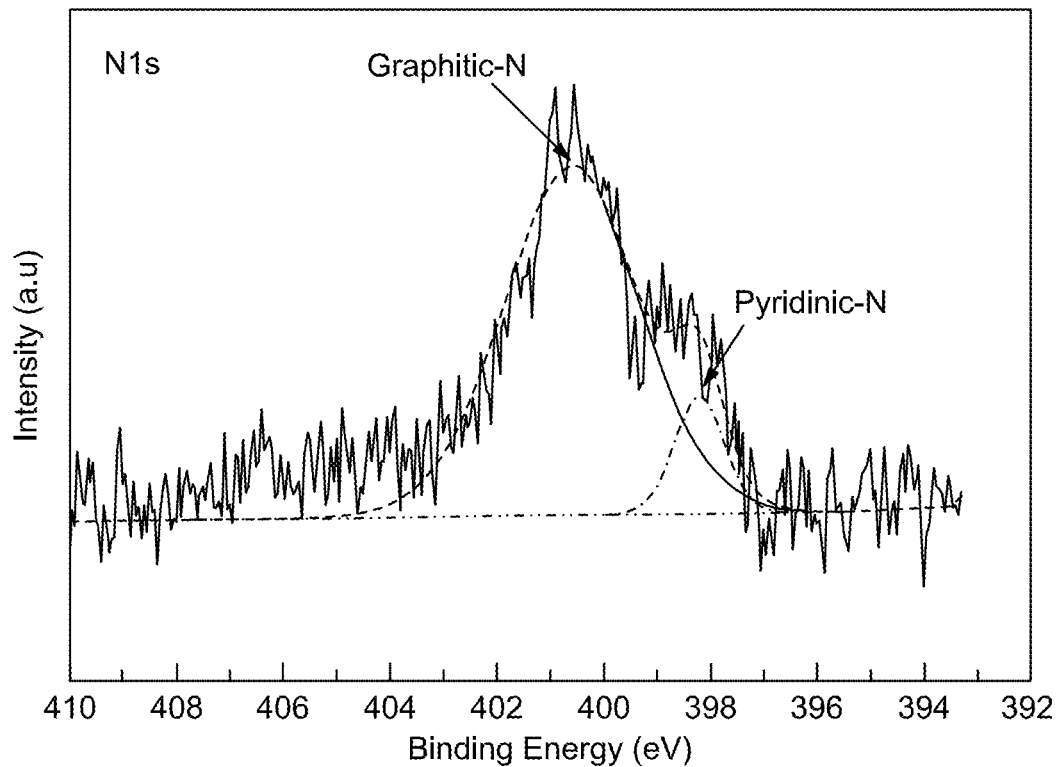
FIG. 6D shows a corresponding high-resolution spectra of N1s, of the C-850 activated carbon, as obtained by XPS surface chemical analysis, according to certain embodiments.

The chemical composition on the surfaces of C-600 and C-850 was confirmed by XPS analysis, as shown in FIGS. 5A-5D and FIGS. 6A-6D, respectively. The XPS spectra of both samples show the presence of carbon (C 1s), oxygen (O 1s), and nitrogen (N 1s) as the main constituent elements (FIG. 5B and FIG. 6B). The high-resolution deconvoluted spectrum of C 1s indicates three peaks at 289, 285.6, and 284.7 eV, which are assigned to the carbon-oxygen double bond (C═O), carbon-oxygen single bond (C—O), and $sp^2$ hybridized carbon, respectively (FIG. 5B and FIG. 6B). The peaks at 289 and 285.6 eV confirm the presence of oxygen in the form of carboxylic (COOH) and ether (C—OR) functional groups. FIG. 5C and FIG. 6C illustrates the deconvoluted spectra of O 1s at 533.43 and 532.2 eV, indicating oxygen availability in C-600 and C-850 samples. The peak component at 533.43 eV is assigned to the oxygen single bonded to the aromatic carbon (phenolic oxygen as C—OH), while the component peak at 532.2 eV is ascribed to the carbon-oxygen ether-like single bond (C—OR). The high-resolution deconvoluted peaks of N 1s are shown in FIG. 5D and FIG. 6D. The deconvoluted peaks of N is at 401 and 398.2 eV show the presence of two nitrogen types available in the C-600 and the C-850 samples, i.e., the graphitic nitrogen and pyridinic nitrogen.

Figure 7A:
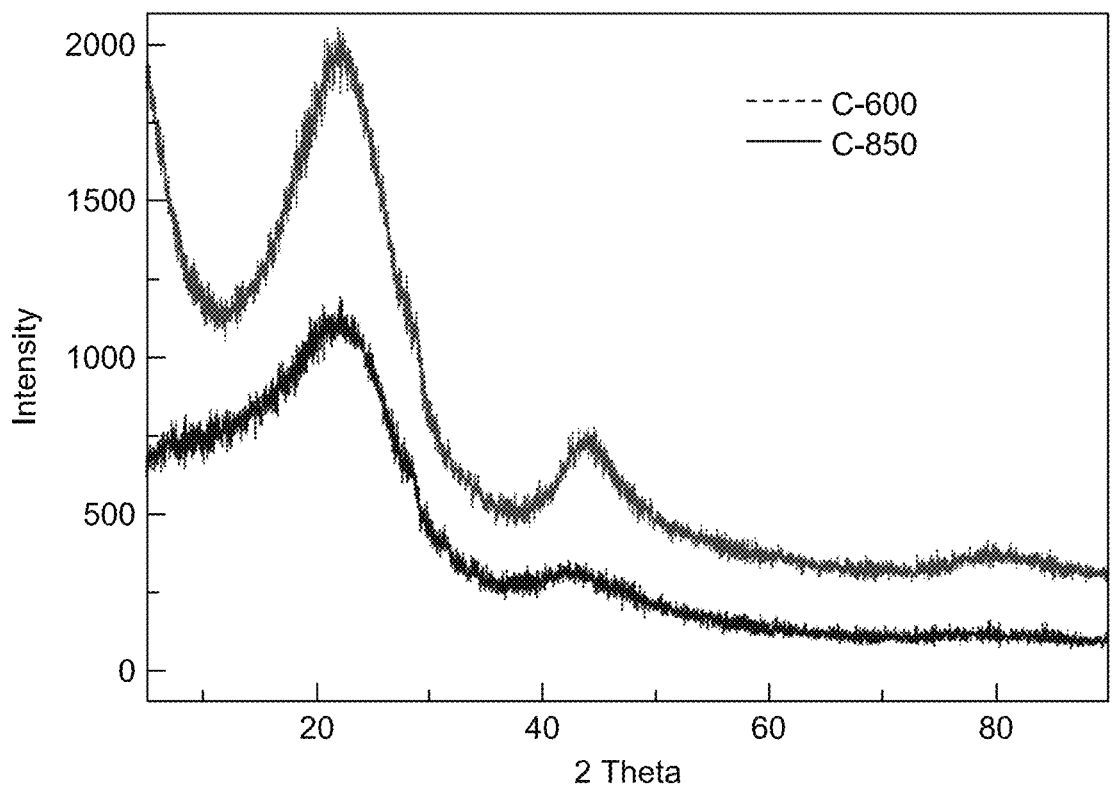
FIG. 7A shows an X-ray diffraction (XRD) pattern of C-600 and C-850 samples, according to certain embodiments.

The XRD measurements of the produced samples were performed to reveal their structures, whether they exhibit crystalline or amorphous nature. Both the physically and chemically activated carbons illustrate a diffraction peak (002) around 2θ=230 and an overlapped peak (100 and 101) around 2θ=44°. It was observed that before and after the $CO_2$ activation process, the obtained C-600 and the C-850 showed a well-introduced graphitic stacking signal at 2θ=22.25° and a broad weak signal at 2θ=43.59°. The peaks that appeared in the C-850 with high intensity is owing to the formation of high-degree interlayer condensation and improved conductivity. The peaks at 2θ=22.25° and 2θ=43.59° are indexed to the (002) and (100) planes of the graphitic carbon, which are typically amorphous structures (FIG. 7A).

Figure 7B:
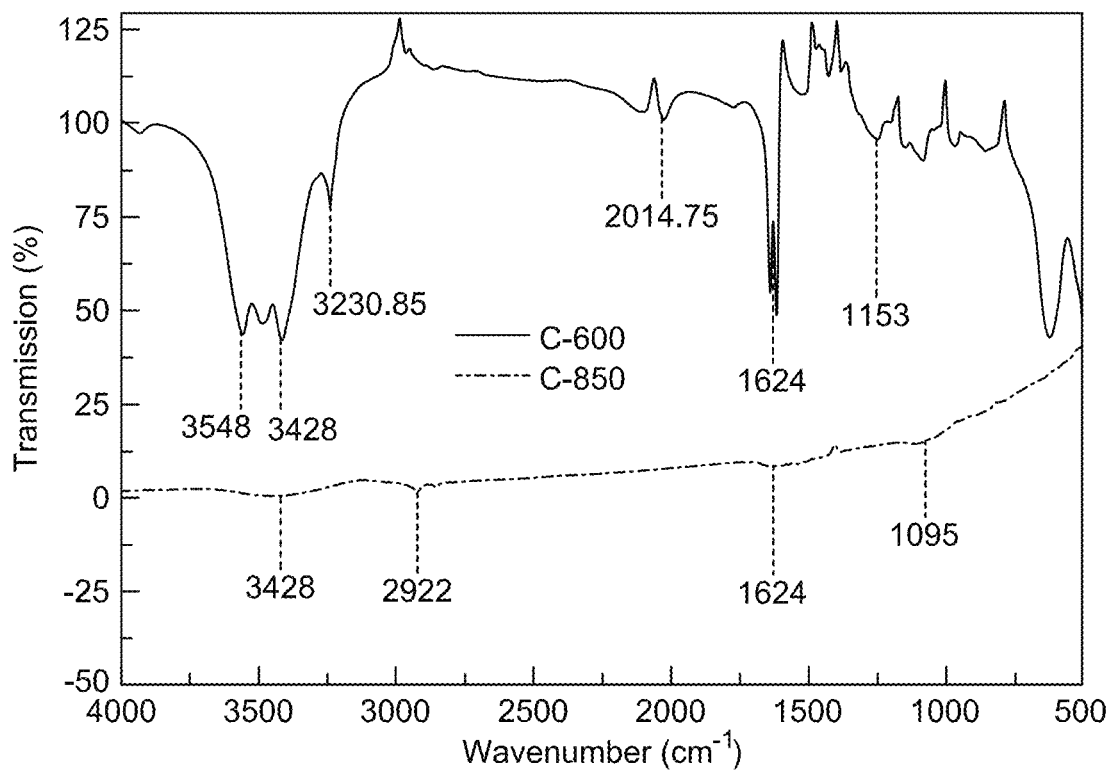
FIG. 7B shows a Fourier-transform infrared spectroscopic (FTIR) analysis of C-600 and C-850 samples, according to certain embodiments.

FT-IR spectroscopy provides information regarding the chemical nature of the materials. FIG. 7B shows the comparative FTIR spectra of C-600 and C-850. The FT-IR spectrum of C-600 indicates that it consists of various functional groups, mainly from various compounds in the biomass. In C-600, the peaks around 3548 $cm^{-1}$ are attributed to the O—H functional group in phenol, whereas the peaks around 3428, 3230.85, 2031.16, 1624, 2014.75, and 1153 $cm^{-1}$ are attributed to the O—H stretching vibration, C═C stretching vibration with a weak band, strong conjugated peak of C═C, aromatic ring, and stretching vibration of C—O functional groups. The remaining peaks, smaller than 1000 $cm^{-1}$, can be attributed to the fingerprint region.

The FT-IR spectrum of the C-850 illustrated that some functional groups, along with their corresponding peaks on 3548, 3230.85, 2031.16, and 1153 $cm^{-1}$, disappeared or attenuated after activation with $CO_2$ at high temperatures. Further, the spectrum of the C-850 showed new peaks at 2922 and 1095 $cm^{-1}$, which indicated the presence of methylene (—$CH_2$—) and C—O stretching vibrations, respectively. Thus, a clear difference was seen among the two samples before and after the activation process.

Figure 7C:
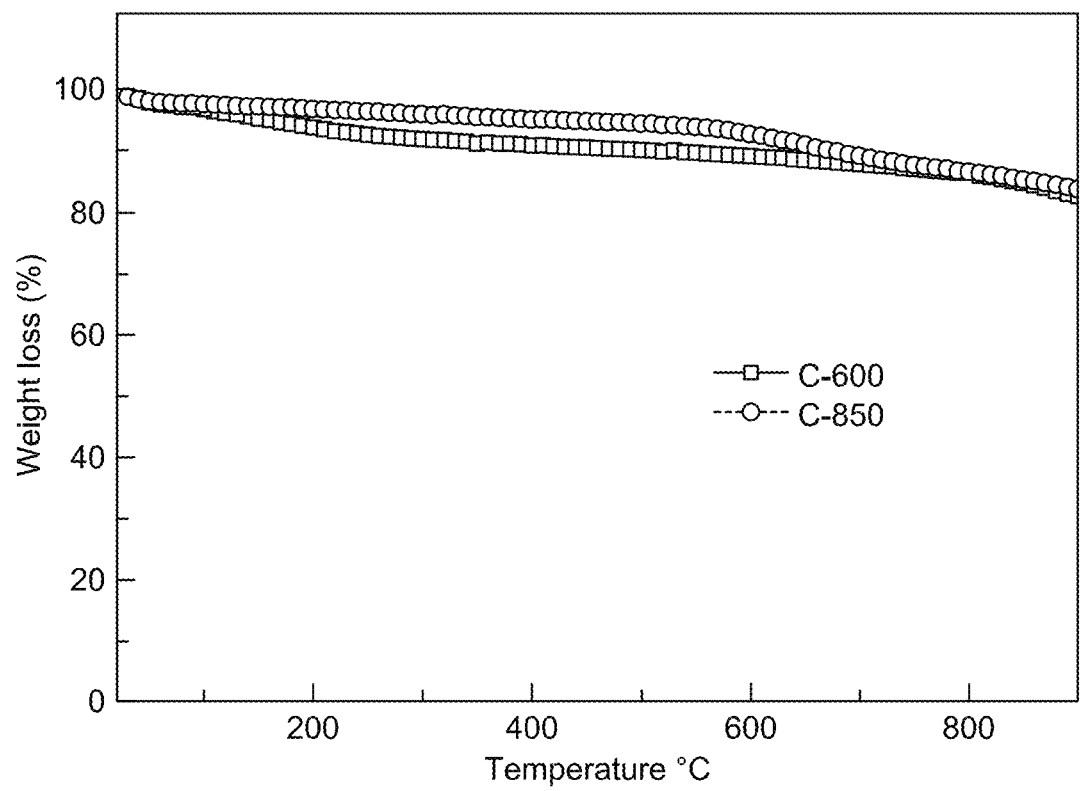
FIG. 7C shows a thermogravimetric analysis (TGA) analysis of C-600 and C-850 samples, according to certain embodiments.

TGA is a tool used to distinguish the difference between the stabilities of C-600 and C-850. FIG. 7C depicts the TGA curves of both samples. The TGA analysis of both samples was conducted in the temperature range from 20 to 900° C. The TGA curve of C-600 showed a gradual weight loss with an overall retention of 77% of the initial weight. By contrast, the TGA line of the C-850 shows a gradual weight loss, and its weight retention after 900° C. was up to 82% of the initial weight. The excellent thermal stability of C-850 is due to the further degradation of the available compounds into carbon at high temperatures, illustrating the stability of physically activated carbon.

Figure 7D:
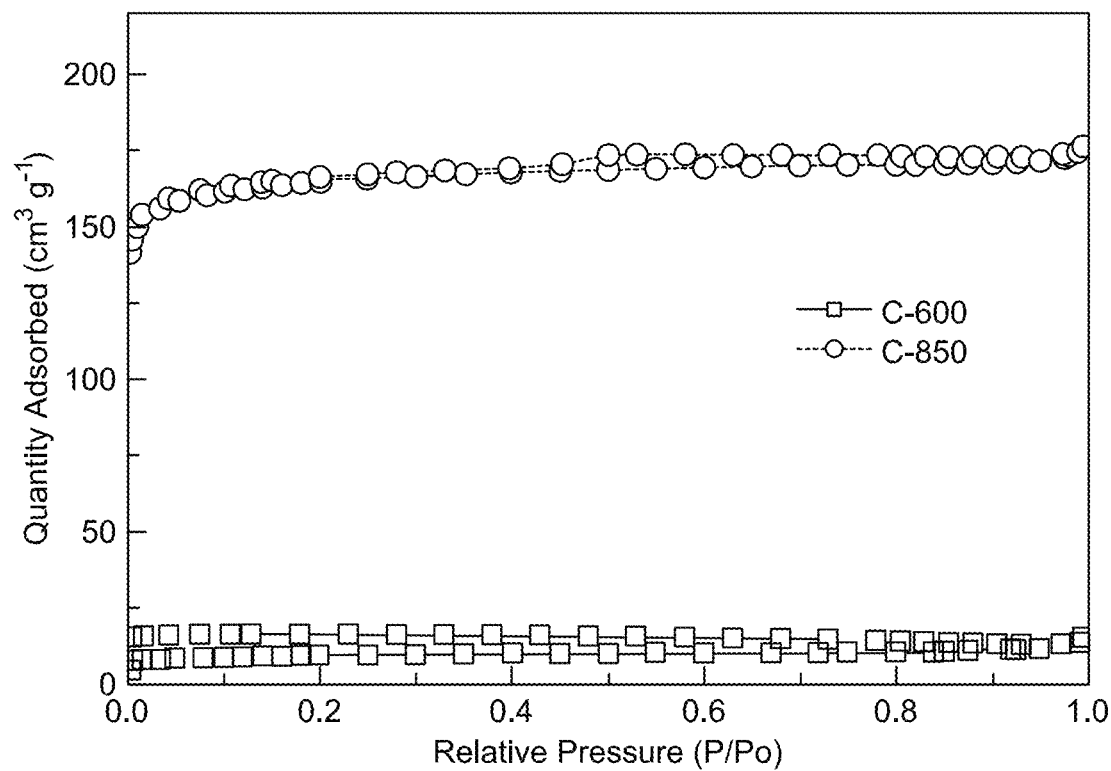
FIG. 7D shows a Brunauer-Emmett-Teller (BET) analysis of C-600 and C-850 samples, according to certain embodiments.

The $N_2$ adsorption and desorption isotherms of C-600 and the C-850 samples are presented in FIG. 7D. The isotherms for C-600 followed a type I curve, whereas the physically activated carbon (C-850) followed type IV isotherms. A small hysteresis loop is observed for the sample of C-850 from $P/P_o$=0.44 to $P/P_o$=0.804, which is because of the mesopore formation. In other words, the isotherm of the C-850 indicates the mesoporous adsorption occurrence on its surface. These results demonstrate the mesopore and heteropore formation after activating C-600 with $CO_2$ at high temperatures. The reason for the formation of more mesopores is the burning off of the majority of the micropores as a result of high temperature activation. The BET surface areas of C-600 and C-850 were 35.21 and 659.56 $m^2 \cdot g^{-1}$, respectively. The BET of the C-850 is higher than that of C-600, showing the effective activation by carbon dioxide, which has improved the pore formation during the activation process at high temperatures.

Figure 8A:
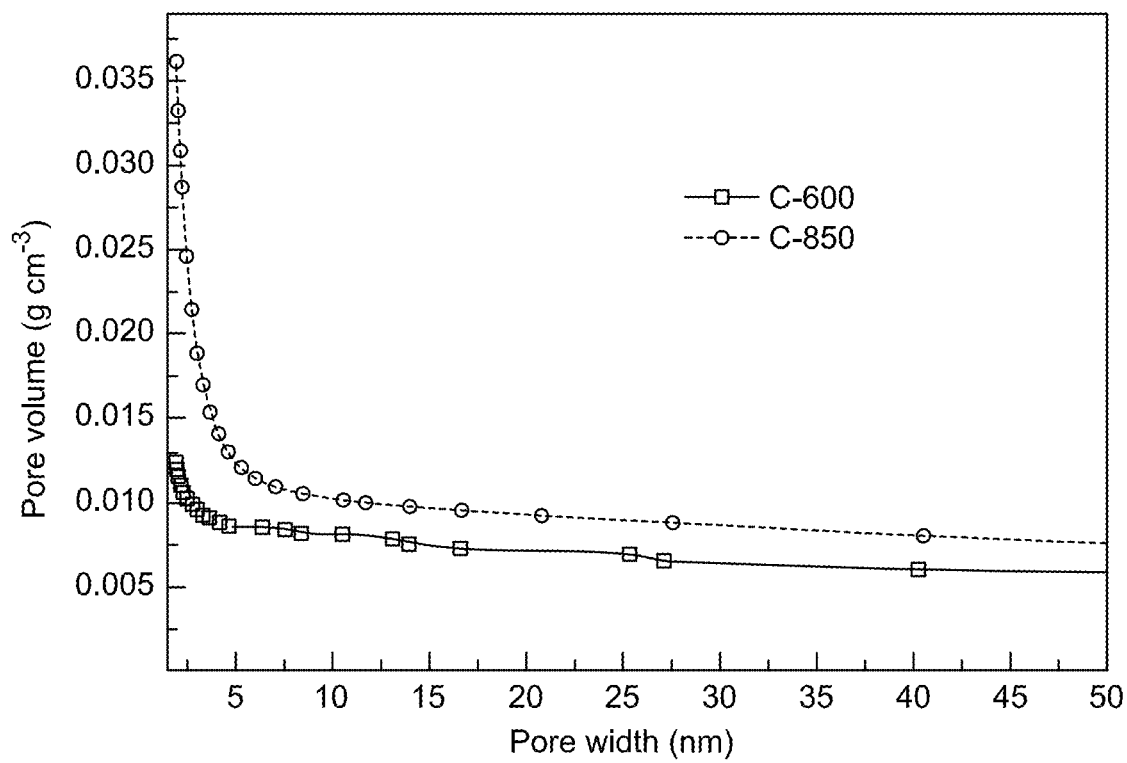
FIG. 8A shows a Barrett-Joyner-Halenda (BJH) analysis of C-600 and C-850 samples, according to certain embodiments.
Figure 8B:
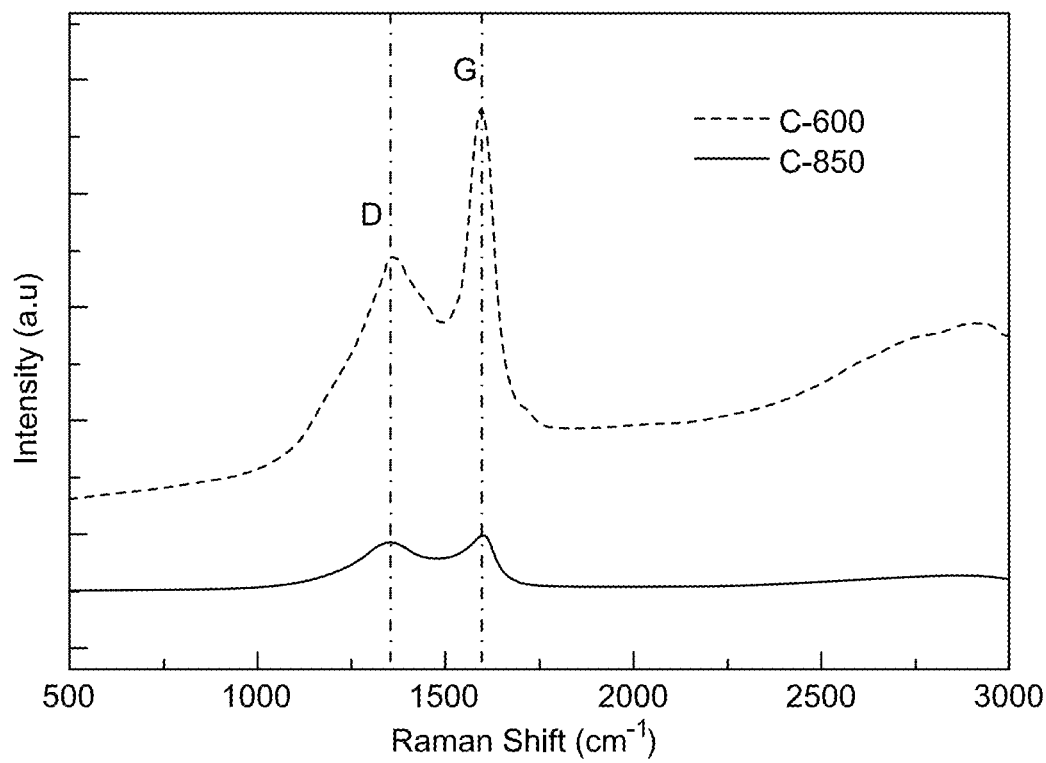
FIG. 8B shows Raman spectra of C-600 and C-850 samples, according to certain embodiments.

The pore size distributions of C-600 and C-850 were calculated using the Barrett-Joyner-Halenda Model (BJH), as presented in FIG. 8A. It was observed that both the samples exhibited a heteroporous structure (mixture of micro-, meso-, and heteropores). The characteristic micro- and mesopore diameters were found in the range of 1.8-2.9 nm, respectively. Raman spectroscopy was performed to determine the graphitic and defective nature of the samples. In the Raman spectra, both the C-600 and the C-850 showed two peaks located at 1358 and 1596 $cm^{-1}$, which were assigned to the D and G bands, respectively (FIG. 8B). The D-band corresponds to the double-resonance Raman process in disordered carbons, while the G-band is associated with the graphite structure. In other words, the G-band is related to the $sp^2$ vibration in the C—C planar graphite, and the D-band showed a disordered structure. The intensity of the D-band depends on the defects and disordered structure in the carbon skeleton. The low-intensity peak ratio between the D- and G-bands ($I_D/I_A$=0.733) shows the more graphitic and less defective nature of C-600 and C-850.

Example 8: Electrochemical Characterization

Figure 9A:
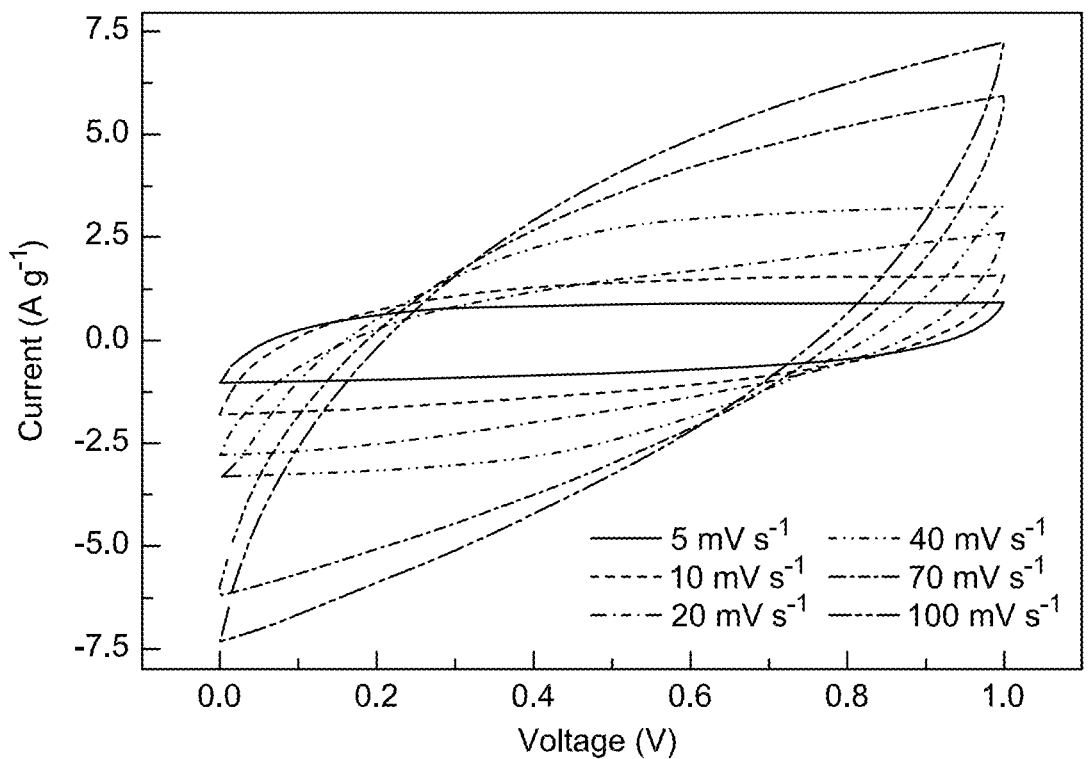
FIG. 9A shows cyclic voltammetric (CV) curves of a C-850 electrode with the PVA/KOH gel polymer electrolyte at various scan rates, according to certain embodiments.

Though C-600 is amorphous and shows graphitic properties, its low BET (35.21 $m^2g^{-1}$) was unsuitable for testing its electrochemical performance for SCs application. This is because this surface area is unfavorable for forming an electric double layer for all-solid-state capacitors. Therefore, only the C-850 was used for further electrochemical measurements due to its appropriate specific surface area. The electrochemical measurement of the assembled symmetric SCs, configured as Al/C-850//PVA-KOH//C-850/Al in a Swagelok cell, was performed, and the results of this study are depicted in FIG. 9. FIG. 9A depicts the CV curves of the C-850 electrodes at different scan rates from 5 to 100 mV·s$^{-1}$ with an operation potential window between 0 and 1 V. The CV curves depict nearly rectangular forms at each scan rate. At a low scan rate of 5 mV·s$^{-1}$, the C-850 electrodes show a CV with a symmetrical rectangular shape without the appearance of any obvious Faradaic peaks, which is characteristic of EDLCs. At scan rates of 5, 10, and 20 mV·s$^{-1}$, the fabricated electrodes retained their rectangular shape with no gradual distortion. However, a gradual distortion has been observed at scan rates of 40, 70, and 100 mV·s$^{-1}$ due to the fast ion migration between the electrodes and electrolyte ions.

Figure 9B:
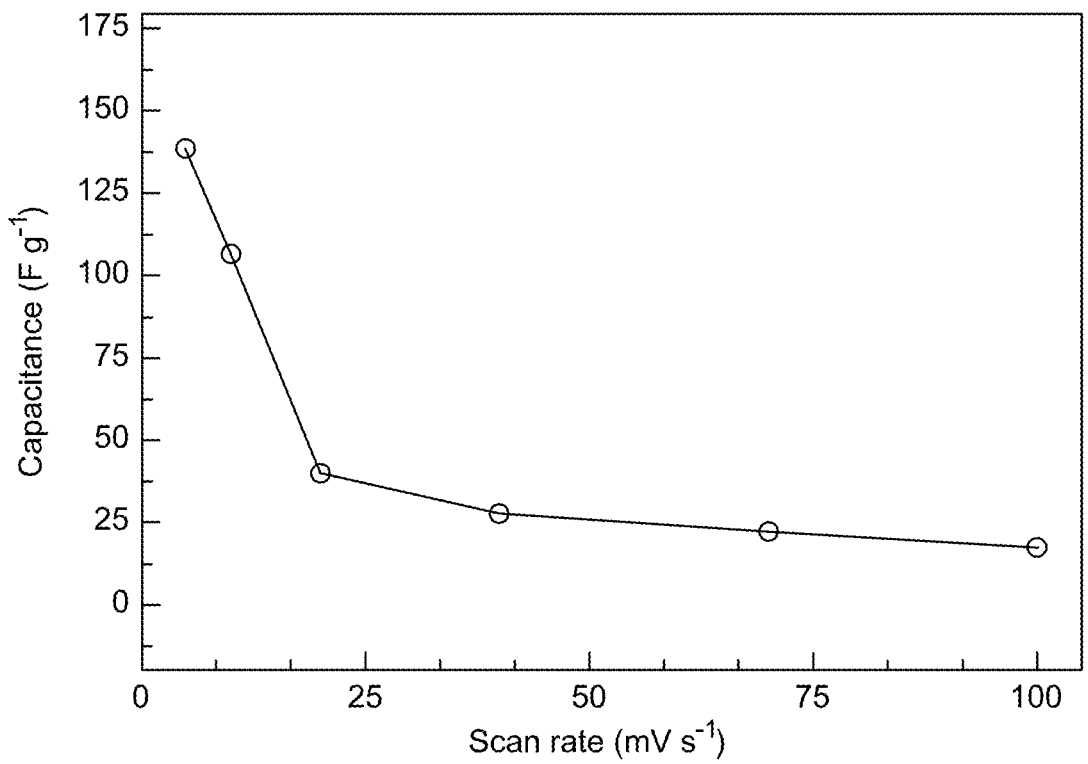
FIG. 9B shows a specific capacitance of the C-850 electrode at different current densities, according to certain embodiments.

The specific capacitance of the C-850 electrode was determined from the CV scan rates using Eq. 1. The influence of the scan speeds on the specific capacitance ($C_s$) of the C-850 electrode was also calculated, as given by FIG. 9B. A specific capacitance of 138.12 F·g$^{-1}$ was achieved at a scan speed of 5 mV·s$^{-1}$. It can be seen in FIG. 9B that with the increase in scan speed (5 to 100 mV·s$^{-1}$), the area below the curves was increased, and as a result, the corresponding specific capacitance was decreased from 138.12 to 17.21 F·g$^{-1}$. The specific capacitance values of the C-850 electrode at 10, 20, 40, 70, and 100 mV·s$^{-1}$ were calculated as 106.56, 40, 28, 22.5, and 17.21, respectively (FIG. 9B). The increasing trend of specific capacitance at low scan speeds was observed because, at slow scan speed, the electrolyte ions were absorbed entirely into the pores of electrodes. Therefore, it is thought that the entire active electrode surface was used to store electrolyte ions. By contrast, at high scan speeds, the ions do not have time to transport completely into the electrode materials' pores; thus, only the external active surface is used for ion storage. The specific surface area (SSA) is a parameter to achieve high SC performance; however, it is not mandatory to gain high specific capacitance always with a larger SSA. The C-850 electrode shows a specific capacitance of 138.12 F·g$^{-1}$. Some electrode materials achieved high capacitance even with a smaller SSA because, in their case, the total available pores are utilized by the ions. Moreover, some of the activated carbons hold a large SSA but own small pore sizes (micropores) and offer less electrochemical performance when compared with the activated carbon possessing smaller SSA but with a larger pore shape such as the meso- and macropores along with the micropores.

Figure 9C:
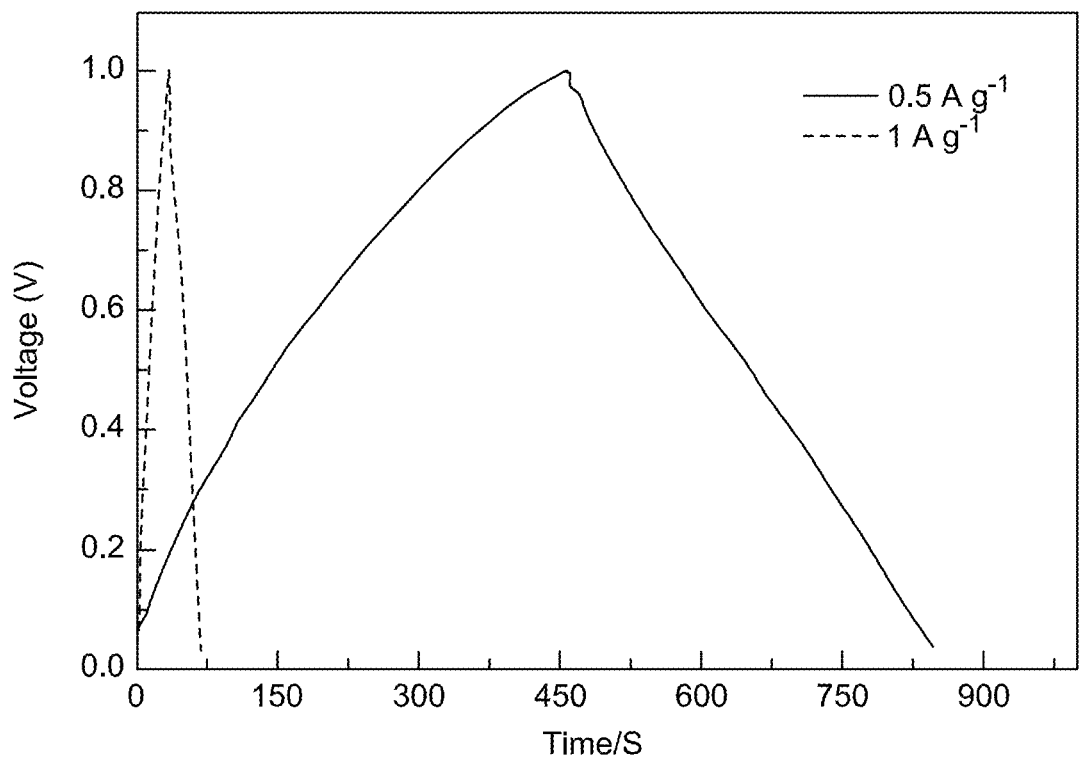
FIG. 9C shows galvanostatic charge-discharge (GCD) curves of the C-850 electrode with the PVA/KOH gel polymer electrolyte with various current densities, according to certain embodiments.
Figure 9D:
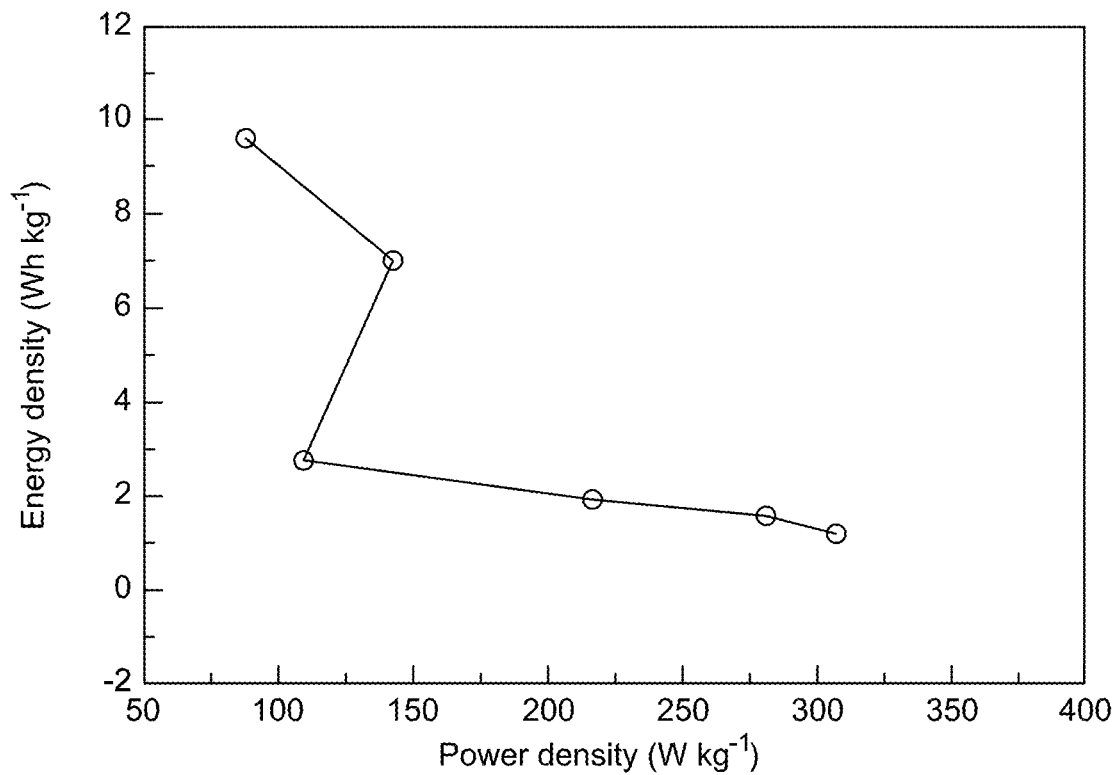
FIG. 9D shows a Ragone plot of coin cell supercapacitors (SCs) for the C-850 electrode with the PVA/KOH gel polymer electrolyte, according to certain embodiments.

The galvanostatic charge-discharge (GCD) test was conducted for the C-850-based all-solid-state SCs. FIG. 9C shows the symmetric and triangle shapes at different current rates, illustrating the electric double-layer formation phenomenon. At a current density of 0.5 A·g$^{-1}$, a specific capacitance of 88.4 F·g$^{-1}$ was calculated from the GCD using Eq. 2. An energy density of 9.6 Wh kg$^{-1}$ at a power density of 87.86 W·kg$^{-1}$ was achieved for the assembled SCs, as shown in FIG. 9D. The electrodes retained an energy density of 1.2 Wh·kg$^{-1}$ when the power density achieved 307.46 W·kg$^{-1}$. The energy and power densities were calculated using Eq. 3 and Eq. 4, respectively.

A NaOH-activated carbon electrode prepared from date palm fronds showed a specific capacitance of up to 156.8 F·g$^{-1}$ at 0.4 A g$^{-1}$. A similar value of 150 F·g$^{-1}$ at 0.3 A·g$^{-1}$ was reported by Farma et al. using KOH—$CO_2$-activated carbon from empty fruit bunches of oil palm. In another study, a commercial activated carbon was treated and added to waste palm and activated with KOH that exhibited 226.0 F·g$^{-1}$ at 0.5 A·g$^{-1}$ using a PVA-based gel electrolyte. A $CO_2$-activated carbon electrode derived from date palm fronds at the same current density of 1 A·g$^{-1}$ achieved 56.8 F·g$^{-1}$. The electrodes assembled from the prepared physically activated carbon showed a specific capacitance of 88.4 F·g$^{-1}$ at 0.5 A·g$^{-1}$. A detailed comparison of various activated carbons and their supercapacitors is shown in Table 1.

TABLE 1

Comparative data of the various biomass-derived activated carbons and their supercapacitor performances.

| No | AC precursor | Activating Agent | BET ($m^2 \cdot g^{-1}$) | Capacitance ($F \cdot g^{-1}$) | Current Density ($A \cdot g^{-1}$) | Reference |
|---|---|---|---|---|---|---|
| 1 | Date Palm Fronds | NaOH | 1011.00 | 156.80 | 0.40 | 1 |
| 2 | Date Palm Fronds | CO2 | 603.50 | 56.80 | 1.00 | 1 |
| 3 | Empty fruit bunches | KOH—$CO_2$ | 1704.00 | 135.00 | 0.50 | 2 |
| 4 | Waste Palm | KOH | 1642.00 | 226.00 | 0.50 | 3 |
| 5 | Date Stone | KOH | 1612.00 | 126.50 | 0.50 | 4 |
| 6 | Rice Husk | KOH | 2696.00 | 147.00 | 0.10 | 5 |
| 7 | Present disclosure | $CO_2$ | 659.56 | 88.40 | 0.50 | — |

[1] See: Alhebshi, N. A.; Salah, N.; Hussain, H.; Salah, Y. N.; Yin, J. Structural and Electrochemical Properties of Physically and Chemically Activated Carbon Nanoparticles for Supercapacitors. Nanomaterials 2022, 12, 122.
[2] See: Farma, R.; Deraman, M.; Awitdrus, A.; Talib, I. A.; Taer, E.; Basri, N. H.; Manjunatha, J. G.; Ishak, M. M.; Dollah, B. N. M.; Hashmi, S. A. Preparation of highly porous binderless activated carbon electrodes from fibres of oil palm empty fruit bunches for application in supercapacitors. Bioresour. Technol. 2013, 132, 254-261.
[3] See: Liu, C.; Chen, W.; Hong, S.; Pan, M.; Jiang, M.; Wu, Q.; Mei, C. Fast Microwave Synthesis of Hierarchical Porous Carbons from Waste Palm Boosted by Activated Carbons for Supercapacitors. Nanomaterials 2019, 9, 405. S5.
[4] See: Dahiru Shuaibu, A.; Saeed Alzahrani, A.; Aziz, M. A. High-performance Supercapacitors Enabled by Highly-porous Date Stone-derived Activated Carbon and Organic Redox Gel Electrolyte. Asian J. Org. Chem. n/a, e202300050.
[5] See: Teo, E. Y. L.; Muniandy, L.; Ng, E.-P.; Adam, F.; Mohamed, A. R.; Jose, R.; Chong, K. F. High surface area activated carbon from rice husk as a high-performance supercapacitor electrode. Electrochim. Acta 2016, 192, 110-119.

Figure 10A:
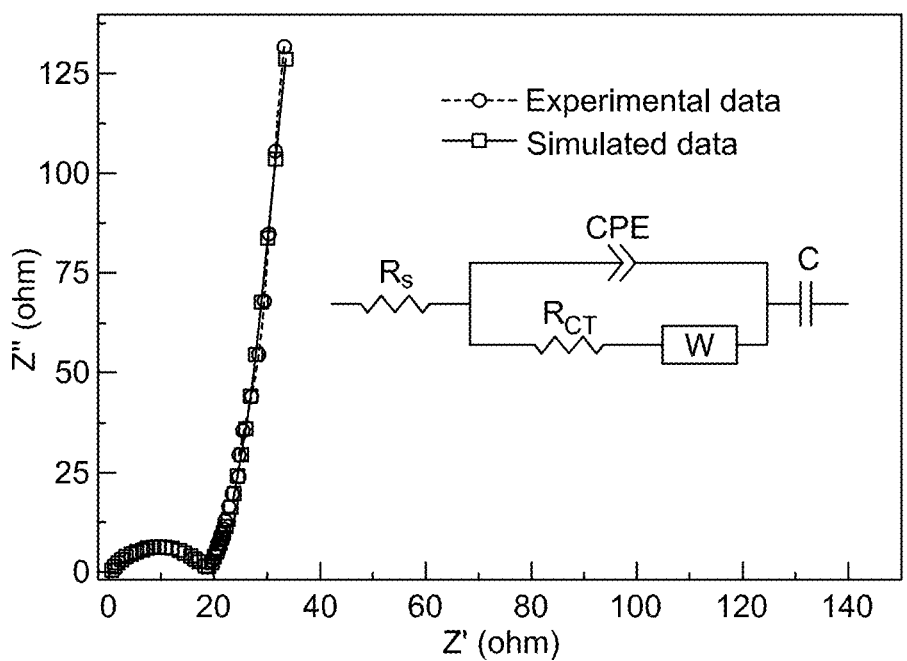
FIG. 10A shows Nyquist plots of an experimental and simulated data for the C-850 electrode with the inset of the equivalent circuit, according to certain embodiments.
Figure 10B:
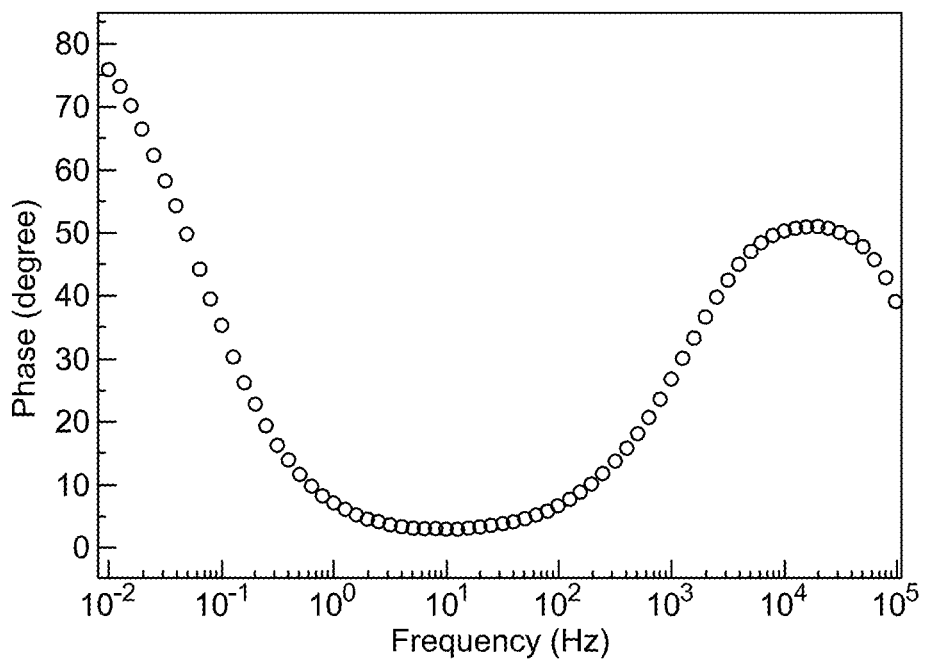
FIG. 10B shows a Bode plot showing phase angle values vs. frequency graph, according to certain embodiments.

To further understand the ion transportation and electrode resistance, EIS and the corresponding Nyquist plot were obtained in the frequency range from 100 kHz to 10 mHz (FIG. 10A). The Nyquist plot is composed of the real and imaginary parts of the impedance that assist in calculating the different resistances (R) related to the device. The low-frequency region in the Nyquist plot displays a sharp growing curve, revealing the capacitive nature of the assembled device. A slope in the low-frequency region or the inclined line above the semicircle shoulder in the low-frequency region is termed the Warburg impedance (W), which is associated with ion diffusion into porous channels of electrodes. In the high-frequency region, the x-intersection illustrates the ohmic resistance of the electrolyte and the internal resistance of the electrode, which is defined as RS. The semicircle from the high to medium frequency region corresponds to the charge transfer resistance (RCT). The EIS data were simulated through the inset model in FIG. 10A and the values obtained for the RS and RCT were 0.54 and 17.86Ω, respectively. These results revealed the low resistance in all-solid-state SCs. The obtained Nyquist plot data was simulated through the inset model. In FIG. 10A, the experimental and simulated data obtained for the C-850-based all-solid-state SCs are presented by the dotted and solid lines, respectively. The values calculated for the RS and RCT are based on the simulated data of the Nyquist plot. In the applied model, CPE reflected the interparticle electronic resistance of the electrodes. Further, the data developed by the EIS analysis was utilized to draw the Bode plot from the phase angle value on the y-axis and the frequency on the x-axis (FIG. 10B). The Bode plot curve indicated the wide trend in the high-frequency region that increased nearly vertically in the low-frequency region. At the low-frequency region, the phase angle value was measured to be 76.6°, which showed the capacitive behavior of the assembled SCs, and this capacitive behavior is almost similar to the capacitive behavior of the ideal SCs, i.e., 90°.

Ohm's law was used to calculate the Equivalent series resistance ($R_{ESR}$) from the GCD curves at 0.5 and 1 A·g$^{-1}$ using Eq. 5

$$R = \frac{\Delta V}{I} \quad (5)$$

Similarly, the $R_{ESR}$ value can be calculated from the GCD measurements at different current densities (50 ohms (Ω) at 0.5 A·g$^{-1}$ and 135Ω at 1 A·g$^{-1}$). The $R_{ESR}$ value obtained from EIS measurement is usually estimated from the width of the semicircle on the x-axis, which is around 18Ω. Ideally, the $R_{ESR}$ obtained at different current densities should be the same. In the case of supercapacitors, high resistance is created due to the fast ion transport during the large charge current passage through the device. This is the main reason that the potential drop in GCD curves increases as the current drawn from it is increased.

Calculation of $R_{ESR}$ at 0.5 and 1 A·g$^{-1}$.

At 0.5 A·g$^{-1}$, $$R_{ESR} = \frac{1.000 - 0.975 \text{ V}}{0.5 \text{ mA}}$$

$$R_{ESR} = \frac{0.025 \text{ V}}{0.5 \times 10^{-3} A} = 50 \text{ }\Omega$$

At 1 A·g$^{-1}$, $$R_{ESR} = \frac{1.000 - 0.865 \text{ V}}{1 \text{ mA}}$$

$$R_{ESR} = \frac{0.135 \text{ V}}{1 \times 10^{-3} A} = 135 \text{ }\Omega$$

Numerous modifications and variations of the present disclosure are possible in light of the above teachings. It is therefore to be understood that within the scope of the appended claims, the invention may be practiced otherwise than as specifically described herein.

The invention claimed is:

1. An electrode comprising:
   a substrate;
   a binding compound,
   date seed mesoporous carbon; and
   a conductive carbon other than the date seed mesoporous carbon,
   wherein the date seed mesoporous carbon has a surface area of 600-800 m$^2$/g, and an average pore size of 1-5 nm,
   wherein the date seed mesoporous carbon has a sheet morphology, and
   wherein a mixture of the binding compound, the date seed mesoporous carbon, and the conductive carbon other than the date seed mesoporous carbon is coated on a surface of the substrate.

2. The electrode of claim 1, wherein the mixture comprises 1-10 wt. % of the binding compound, 60-80 wt. % of the date seed mesoporous carbon, and 10-30 wt. % conductive carbon other than the date seed mesoporous carbon, based on a total weight of the mixture.

3. The electrode of claim 1, wherein the date seed mesoporous carbon comprises amorphous graphitic carbon.

4. The electrode of claim 1, wherein sheets of the date seed mesoporous carbon have an average width of 50-200 nm.

5. The electrode of claim 1, wherein sheets of the date seed mesoporous carbon have an average length of greater than 200 nm.

6. The electrode of claim 1, wherein sheets of the date seed mesoporous carbon stack on top of one another.

7. The electrode of claim 1, wherein the date seed mesoporous carbon comprises C, N and O.

8. The electrode of claim 1, wherein pores of the date seed mesoporous carbon are present on a surface of the sheets.

9. The electrode of claim 1, wherein the date seed mesoporous carbon comprises both mesopores and micropores.

10. The electrode of claim 1, wherein the binding compound is a fluorinated polymer.

11. The electrode of claim 1, wherein the conductive carbon other than the date seed mesoporous carbon is at least one selected from the group consisting of graphite, activated carbon, reduced graphene oxide, carbon nanotubes, carbon nanofibers, and carbon black.

12. The electrode of claim 1, wherein the substrate is made from at least one material selected from the group consisting of stainless steel, aluminum, nickel, copper, platinum, zinc, tungsten, and titanium.

13. The electrode of claim 1, having a specific capacitance of 100-150 F/g at a scan rate of 5 mV/s.

14. The electrode of claim 1, wherein the date seed mesoporous carbon is made by a method comprising:
   pulverizing date seeds into a date seed powder;

pyrolyzing the date seed powder at a temperature of 500-700° C. under an inert atmosphere to form a pyrolyzed date seed powder;

pulverizing the pyrolyzed date seed powder into a refined date seed powder; and activating the refined date seed powder at a temperature of 700-1,000° C. under carbon dioxide to form the date seed mesoporous carbon.

15. The electrode of claim 14, wherein the method does not include a chemical activation agent.

16. A supercapacitor, comprising:
two of the electrodes of claim 1; and
a solid-state electrolyte,
wherein the electrodes are disposed facing each other, and
wherein the solid-state electrolyte is present between the electrodes to form the supercapacitor.

17. The supercapacitor of claim 16, wherein the solid-state electrolyte comprises a polymer and a base.

18. The supercapacitor of claim 16, wherein the solid-state electrolyte comprises polyvinyl alcohol and KOH.

19. The supercapacitor of claim 16, having a power density of 70-100 W/kg.

20. The electrode of claim 1, wherein the date seed mesoporous carbon is obtained by first devolatizing a date seed biomass at a temperature of at least 600° C. under an inert atmosphere to form a devolatized date seed powder; then activating the devolatized date seed powder at a temperature of at least 850° C. in an carbon dioxide atmosphere to form the date seed mesoporous carbon.

* * * * *